United States Patent [19]
Marinelli

[11] Patent Number: 6,151,563
[45] Date of Patent: *Nov. 21, 2000

[54] SPEED, SPIN RATE, AND CURVE MEASURING DEVICE USING MAGNETIC FIELD SENSORS

[75] Inventor: David J. Marinelli, Superior, Colo.

[73] Assignee: Silicon Pie, Inc., Superior, Colo.

[*] Notice: This patent is subject to a terminal disclaimer.

[21] Appl. No.: 09/396,928

[22] Filed: Sep. 15, 1999

Related U.S. Application Data

[63] Continuation-in-part of application No. 09/346,003, Jul. 1, 1999, which is a continuation-in-part of application No. 09/007,241, Jan. 14, 1998.

[51] Int. Cl.[7] .................................................. G06F 15/00
[52] U.S. Cl. ........................ 702/141; 702/142; 702/149; 702/150; 473/569
[58] Field of Search ..................................... 702/141, 142, 702/149, 150; 473/569; 368/250, 255

[56] References Cited

U.S. PATENT DOCUMENTS

| | | |
|---|---|---|
| 4,775,948 | 10/1988 | Dial et al. . |
| 5,497,704 | 3/1996 | Kurschner et al. . |
| 5,526,326 | 6/1996 | Fekete et al. . |
| 5,564,698 | 10/1996 | Honey et al. . |
| 5,592,401 | 1/1997 | Kramer . |
| 5,761,096 | 6/1998 | Zakutin . |
| 5,779,576 | 7/1998 | Smith, III et al. . |

*Primary Examiner*—Marc S. Hoff
*Assistant Examiner*—Hien Vo
*Attorney, Agent, or Firm*—James R. Young

[57] ABSTRACT

A device for measuring a movable object, such as a baseball, football, hockey puck, soccer ball, tennis ball, bowling ball, or a golf ball. Part of the device, called the object unit, is embedded, secured, or attached to the movable object of interest, and has a spin detection circuit, electronic processor circuit, magnetic field sensor circuit, and a radio transmitter. The other part of the device, called the monitor unit, is held or worn by the user and serves as the user interface for the device. The monitor unit has a radio receiver, a processor, an input keypad, and an output display that shows the various measured motion characteristics of the movable object, such as the time of flight, speed, trajectory height, spin rate, or curve of the movable object, and allows the user to input data to the device.

26 Claims, 20 Drawing Sheets

SPEED, SPIN RATE, AND CURVE MEASURING DEVICE USING MAGNETIC FIELD SENSORS

CROSS REFERENCE TO RELATED APPLICATIONS

This application is a continuation-in-part of application Ser. No. 09/346,003 of Dave Marinelli filed on Jul. 1, 1999 entitled "A Speed, Spin Rate, and Curve Measuring Device Using Multiple Sensor Types", which was a continuation-in-part of application Ser. No. 09/007,241 of Dave Marinelli filed on Jan. 14, 1998 entitled "A Speed, Spin Rate, and Curve Measuring Device."

FIELD OF THE INVENTION

This invention relates to measuring motion characteristics of movable objects and more particularly to measuring the speed, spin rate, and curve of a movable object. Even more particularly, the invention relates to measuring the speed, spin rate, and curve of a sporting device, such as a baseball, bowling ball, football, hockey puck, soccer ball, tennis ball, or golf ball by utilizing an embedded, secured, or attached object unit and an external monitor unit.

BACKGROUND OF THE INVENTION

Participants of many sports, including baseball, football, soccer, hockey, tennis, and golf, and their coaches, are often interested in knowing the motion characteristics of the object used in a sport, such as the distance, time of flight, speed, height, spin rate, or curve of thrown, kicked, or batted balls and slapped hockey pucks. Typically, the speed of a moving ball is measured using a Doppler radar system. Doppler radar systems determine a moving ball's speed by analyzing radar beams reflected off the ball. Although accurate, these systems are expensive and normally cannot be operated by the athlete whose toss or hit is being measured. For these reasons, systems of this type are generally restricted to organized sport teams. Also, Doppler radar systems are not able to measure the spin rate of the ball of interest. Spin rate information is useful, for example, in optimizing a baseball pitcher's curve ball pitching ability.

Several other methods for measuring the motion characteristics of moving objects have been proposed over the years that rely on devices wholly external to the moving object. Another approach to the problem involves placing a measurement device within the moving object. Four such systems are described in U.S. Pat. No. 4,775,948 issued on Oct. 4, 1988 to Dial et al. entitled "Baseball Having Inherent Speed-Measuring Capabilities", the '948 patent; U.S. Pat. No. 5,526,326 issued on Jun. 11, 1996 to Fekete et al. entitled "Speed Indicating Ball", the '326 patent; U.S. Pat. No. 5,761,096 issued on Jun. 2, 1998 to Zakutin entitled "Speed Sensing Projectile", the '096 patent; and U.S. Pat. No. 5,779,576 issued on Jul. 14, 1998 to Smith, III et al. entitled "Throw Measuring Football", the '576 patent.

The '948 and '096 patents involve detecting the time of a baseball flight using devices internal to the ball that respond to the linear acceleration at the beginning of a toss and/or at the end when the ball is caught. The '948 patent also proposes using a button on the surface of the ball to detect when the ball is released by the pitcher. The '096 patent discloses a projectile, such as a baseball, having an inertial switch that opens and closes in response to linear accelerations. The inertial switch is the subject of U.S. Pat. No. 5,786,553 issued on Jul. 28, 1998 to Zakutin entitled "Inertial Switch." An electronic timer internal to the ball measures the ball's time between acceleration events as the time of flight over a measured distance, and on that basis determines the ball's speed. The speed is then displayed on the surface of the ball via a liquid crystal display.

The '326 patent suggests that a more economical and durable method of accomplishing the same task is met by using mechanical means internal to a ball for determining time of flight and speed. The ball is wound up like a wind-up clock and unwinds when released during a toss. The amount that it unwinds indicates the time-of-flight and, over a known distance, also the ball's speed.

The '576 patent discloses an accelerometer in cooperation with a microprocessor within a projectile, such as a football. The degree of linear acceleration experienced at the beginning of a toss is measured and used to estimate trajectory statistics. A liquid crystal display on the surface of the football allows flight characteristics calculated by the microprocessor to be displayed.

U.S. Pat. No. 5,497,704 issued to Kurschner, et al., on Mar. 12, 1996 entitled "Multifunctional Magnetic Fuze", describes a method for determining the number of rotations of a firing weapon projectile using the earth's magnetic field. In patent '704, however, no means is provided for displaying to the user of the device the measured spin rate of the projectile. The number of projectile rotations is measured to count down to projectile detonation. In addition, in patent '704 the measurement of spin rate is not begun in response to the detection of spin or launch by circuitry wholly internal to the projectile, measurement is begun as a result of interaction with the projectile's firing barrel. Also in patent '704, the firing barrel transmits a signal to the projectile as it is leaving the barrel. This signal initiates the projectile's spin metering process. Also in patent '704, the projectile's muzzle velocity is computed based on the barrel pitch constant of the firing weapon and the measured spin rate of the projectile.

It is thus apparent that there is a need in the art for an improved measuring method or apparatus which does not significantly or materially alter the moving object's physical characteristics or flight performance, has low power requirements, is inexpensive and durable, is applicable to many different types of sports equipment and other movable objects, measures many different motion characteristics including spin rate, and is operable by the person doing the throwing, kicking, or hitting. The present invention meets these and other needs in the art.

This application is a continuation-in-part of application Ser. No. 09/346,003 of Dave Marinelli filed on Jul. 1, 1999 entitled "A Speed, Spin Rate, and Curve Measuring Device Using Multiple Sensor Types," which is incorporated herein by reference for all that is disclosed and taught therein. Application Ser. No. application Ser. No. 09/007,241 of Dave Marinelli.

SUMMARY OF THE INVENTION

It is an aspect of the present invention to measure the time of flight, speed, trajectory height, spin rate, angular velocity, or curve of a movable object utilizing an attached object unit in the movable object.

Another aspect of the invention is to utilize acceleration sensors arranged in an acceleration sensor network to detect spin of a movable object.

Another aspect of the invention is to utilize magnetic field sensors to measure the spin rate of a movable object in response to the spin detection sensor network.

It is another aspect of the invention to utilize an attached object unit in the movable object that emits radio signals and an external monitoring unit that receives radio signals to measure the distance, time of flight, speed, trajectory height, spin rate, or curve of a movable object.

A still further aspect of the invention is to measure motion characteristics of a movable object in such a way as to not significantly alter the physical characteristics and flight performance of the movable object being measured.

The above and other aspects of the invention are accomplished in a device for measuring the motion characteristics, such as time of flight, speed, trajectory height, spin rate, or curve, of a movable object. One type of movable object is a sporting device, such as a baseball, football, hockey puck, soccer ball, tennis ball, bowling ball, or golf ball. Part of the device, called the object unit, is embedded, secured, or attached to the movable object of interest. The object unit may have an attached display for displaying motion characteristics; however, in the preferred embodiment of the invention, the motion characteristics are displayed by a second part of the device, an external monitor unit. The object unit and the monitor unit communicate with each other through radio signals. The monitor unit is held or worn by the user and serves as the user interface for the device. The monitor unit displays the various measured motion characteristics of the movable object and allows the user to input data to the device.

The object unit has an spin detection sensor network, magnetic field sensor, electronic processor circuit, battery, and, in the preferred embodiment, a radio transmitter that can be wholly and invisibly embedded, secured, or attached in the center of a substantially solid movable object, such as a baseball, golf ball, bowling ball, or hockey puck, or attached or suspended inside a deformable movable object, such as a football, soccer ball, or tennis ball.

The monitor unit has a processor, an output display, a keypad for user input, and a radio receiver. It provides a readout of distance, time of flight, speed, trajectory height, spin rate, or curve of a movable object. The monitor unit may be constructed similar to a wristwatch, stopwatch, or a pocket sized calculator for portability, and can provide visual or audio readouts. It could also support the transfer of accumulated projectile statistics to an external system such as a personal computer via wired or wireless communication channels. The personal computer would facilitate analysis of the accumulated statistics.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

Figure 1:
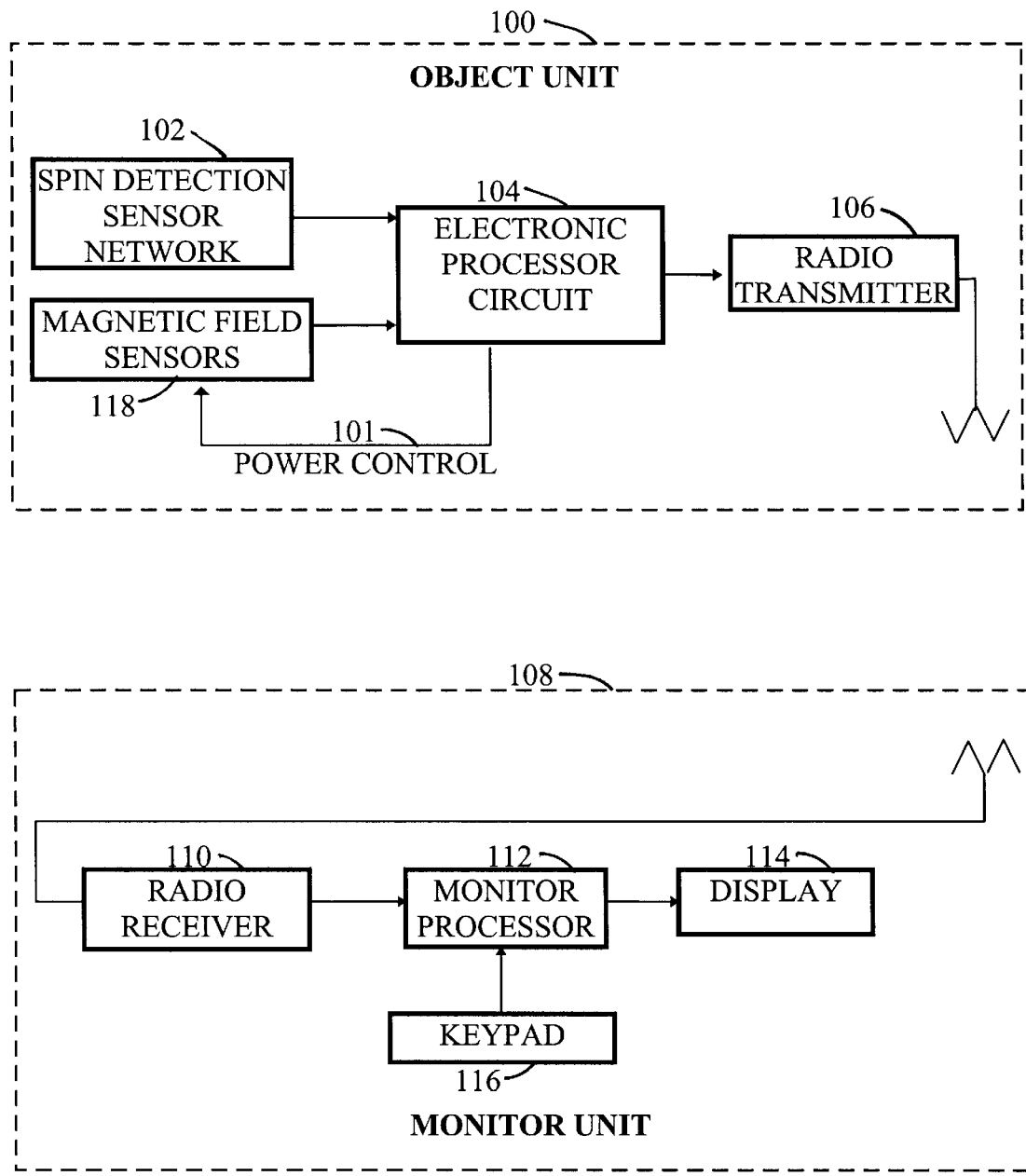
FIG. 1 shows a block diagram of a device for measuring the speed, spin rate, and curve of a movable object of the present invention using a spin detection sensor network and separate object and monitor units.

The following description is of the best presently contemplated mode of carrying out the present invention. This description is not to be taken in a limiting sense but is made merely for the purpose of describing the general principles of the invention. The scope of the invention should be determined by referencing the appended claims.

The present invention improves upon the previous systems in many ways, including: 1) Time of flight is not measured as the time between linear acceleration events or the measurement of linear acceleration, it is measured as the duration of spinning. This method is more reliable since the prior art technique is easily fooled by normal handling that a start-of-pitch or end-of-pitch linear acceleration event occurred, when in fact it did not. Balls do not normally spin unless thrown. 2) The present invention provides for a means to measure the spin rate as well as the speed of a toss. 3) The present invention provides for an external monitor as well as a display embedded within the ball. The external monitor allows for a more durable baseball that appears normal and has no glass LCD display. The external monitor can also accept user input to calculate the ball's speed based on varying distances.

Application Ser. No. 09/007,241 of Dave Marinelli and continuation-in-part application Ser. No. 09/346,003 of Dave Marinelli described methods for determining the spin rate of a moving object using g-force proportional output sensors to measure the centrifugal force generated internal to the moving object due to spinning of the moving object. The spin rate was deduced from the degree of centrifugal force measured.

In the present invention, magnetic field sensors rather than g-force proportional output accelerometers are used to measure the moving object's spin rate. The magnetic field sensors are sensitive to the earth's magnetic field and can sense changes in their orientation with respect to the earth's magnetic field. When securely embedded in a sporting device the magnetic field sensors are used to give an indication of the device's spin rate.

The present invention makes it possible to use spin rate measurement techniques using the earth's magnetic field in applications requiring ultra-low power consumption because the magnetic field sensors are powered for brief periods in response to the detection of a spin event using the spin detection sensor network described in a parent of this application.

Common types of magnetic field sensors currently used to measure the earth's magnetic field are flux-gate, magnetoinductive, anisotropic magnetoresistive, and Lorentz force sensors. Regardless of the type of sensor used, the basic concept remains the same: sense magnetic flux changes acting on the moving object's magnetic field sensor as a result of rotations of the moving object within the earth's fixed magnetic field.

It is not practical for a device with a small embedded battery (such as a baseball) to constantly provide power to embedded magnetic field sensors in an attempt to detect spin and measure the moving object's spin rate—the battery would be exhausted quickly. Therefore, another mechanism is needed to identify the short periods of time when the magnetic field sensors should be powered for measuring spin rate. The preferred mechanism is the network of mechanical switches described in application Ser. No. 09/007,241 of Dave Marinelli that gives an indication of whether an object is spinning or not. The mechanical switch network consumes little or no power when the movable object is not spinning. When the movable object is spinning, the opposing mechanical switches both activate due to centrifugal force thus completing an electrical circuit and activating a microprocessor that has been shut down to a low power mode. Once activated, the microprocessor monitors the spin detector circuit and supplies power to the magnetic field sensors only when spin is detected. If no spin events occur for 2 minutes the microprocessor will enter a low power shutdown state. Combining the mechanical spin detection technique with magnetic field sensing technology allows for the determination of spin rate in very low power applications.

Although the embodiments that follow depict a magnetoinductive sensor, other types of magnetic field sensors may be substituted. Magnetoinductive sensors are well known in the art of magnetic field sensing. A magnetoinductive sensor is simply a single wire winding coil that changes inductance based on its orientation within the surrounding magnetic field, such as the Earth's field. The coil is the inductance element in a inductor/resistor relaxation oscillator. The oscillator's frequency is proportional to the field being measured and to the degree of alignment of the longitudinal axis of the coil with the external magnetic field. As the sensor is rotated 180 degrees with respect to the earth's magnetic field, the observed frequency shift can be as much as 100%. The oscillator's frequency can be monitored by a microcontroller port to determine changes in the orientation of the coil.

Since the axis of rotation of a movable object relative to the magnetic field sensors can vary for many types of movable objects, it is often advantageous to use two or more magnetic field sensors. For example, if the longitudinal axis of a sensor coil is parallel to the axis of rotation, no change in field strength can be detected and spin rate determination is not possible. When using magnetoinductive field sensors, this problem can be overcome if a second magnetoinductive sensor is added that has the longitudinal axis of its sensor coil non-parallel to longitudinal axis of the first magnetoinductive sensor's coil. Ideally, the two coils' longitudinal axis would be orthogonal. Some types of magnetic field sensors do not have a sensor coil and, hence, do not have a longitudinal axis that defines the orientation of the sensor with respect to external fields. For this reason, the more general term "axis of sensitivity" is used in this patent application to describe the spatial orientation of two or more magnetic field sensors.

Figure 2:
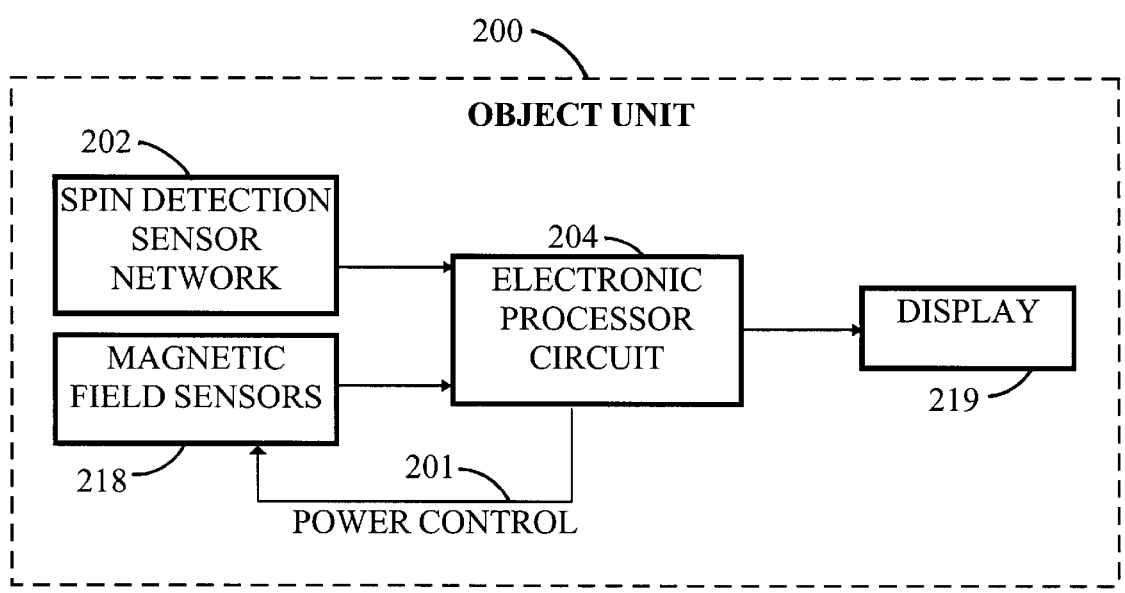
FIG. 2 shows a block diagram of a device for measuring the speed, spin rate, and curve of a movable object of the present invention using a spin detection sensor network and an object unit with an attached display and no monitor unit.

FIGS. 1 and 2 illustrate two versions of the preferred embodiment of a device for measuring the speed, spin rate, and curve of a movable object of the present invention. FIG. 1 shows object unit 100 that is embedded within or secured to the movable object being measured and has radio transmitter 106 for radio transmitting motion data to external monitor unit 108. The motion data transmitted comprises elapsed flight time, speed, trajectory height, time per rotation, spin rate, or any other raw measurement data or data derived from the measurement data. FIG. 2 illustrates object unit 200 that is also embedded within or secured to the movable object being measured; however, object unit 200 has an output display 219, such as an LCD, and no radio transmitter. Motion data is displayed on display 219.

In this document, the term "spin rate data" can refer either to raw measurement data, such as the rotation period, or the number of rotations per unit time, or the number of rotations per spin event, or the calculated angular velocity or spin rate. The terms motion data and motion characteristics include start of spin time, stop of spin time, elapsed spin time, speed, trajectory height, spin rate, angular velocity, rotational period, total number of rotations per spin event, or curve.

Referring now to FIG. 1, in object unit 100 electronic processor 104 receives the output of spin detection sensor network 102 and magnetic field sensor 118. Processor 104 sends motion data to external monitor unit 108 through radio transmitter 106 and controls the application of 3 volt battery power to magnetic field sensor 118 via power control signal 101. Object unit 100 is powered by a battery (not shown in FIG. 1).

Spin detection sensor network 102 may contain accelerometers of one or more of the following types: piezoelectric, mechanical, micro-machined silicon chip, or any other type small enough to be embedded, secured, or attached in a movable object.

Monitor unit 108 in the preferred embodiment of the invention as depicted in FIG. 1 has a radio receiver 110 that communicates with a monitor processor 112. An input keypad 116 inputs information to monitor processor 112, and monitor processor 112 sends information to an output display 114. Object unit 100 communicates with monitor unit 108 through radio transmitter 106 and radio receiver 110.

Spin detection sensor network 102, embedded along with the other components of object unit 100 within or attached to a movable object, detects spin or rotation about an axis internal to the movable object.

The detection of spin for a ball is essentially the same as the detection of flight or rolling. For example, baseballs and footballs spin when tossed and generally do not spin otherwise. Therefore, if monitor unit 108 is programmed by the user with the distance of a ball's toss, which can be entered by the user with keypad 116, monitor unit 108 can calculate the ball's speed if the ball transmits to monitor unit 108 its spin time, since spin time is assumed to equal time of flight.

Object unit 200 of FIG. 2 is identical to object unit 100 of FIG. 1 except that radio transmitter 106 of object unit 100 is replaced by display 219 of object unit 200. Referring now to FIG. 2, in object unit 200 electronic processor 204 receives the output of spin detection sensor network 202 and magnetic field sensor 218. Processor 204 displays motion data on display 219 and controls the application of 3 volt battery power to magnetic field sensor 218 via power control signal 201. Object unit 200 is powered by a battery (not shown in FIG. 2).

Spin detection sensor network 202 may contain accelerometers of one or more of the following types: piezoelectric, mechanical, micro-machined silicon chip, or any other type small enough to be embedded, secured, or attached in a movable object.

Spin detection sensor network 202, embedded along with the other components of object unit 200 within or attached to a movable object, detects spin or rotation about an axis internal to the movable object.

Figure 3:
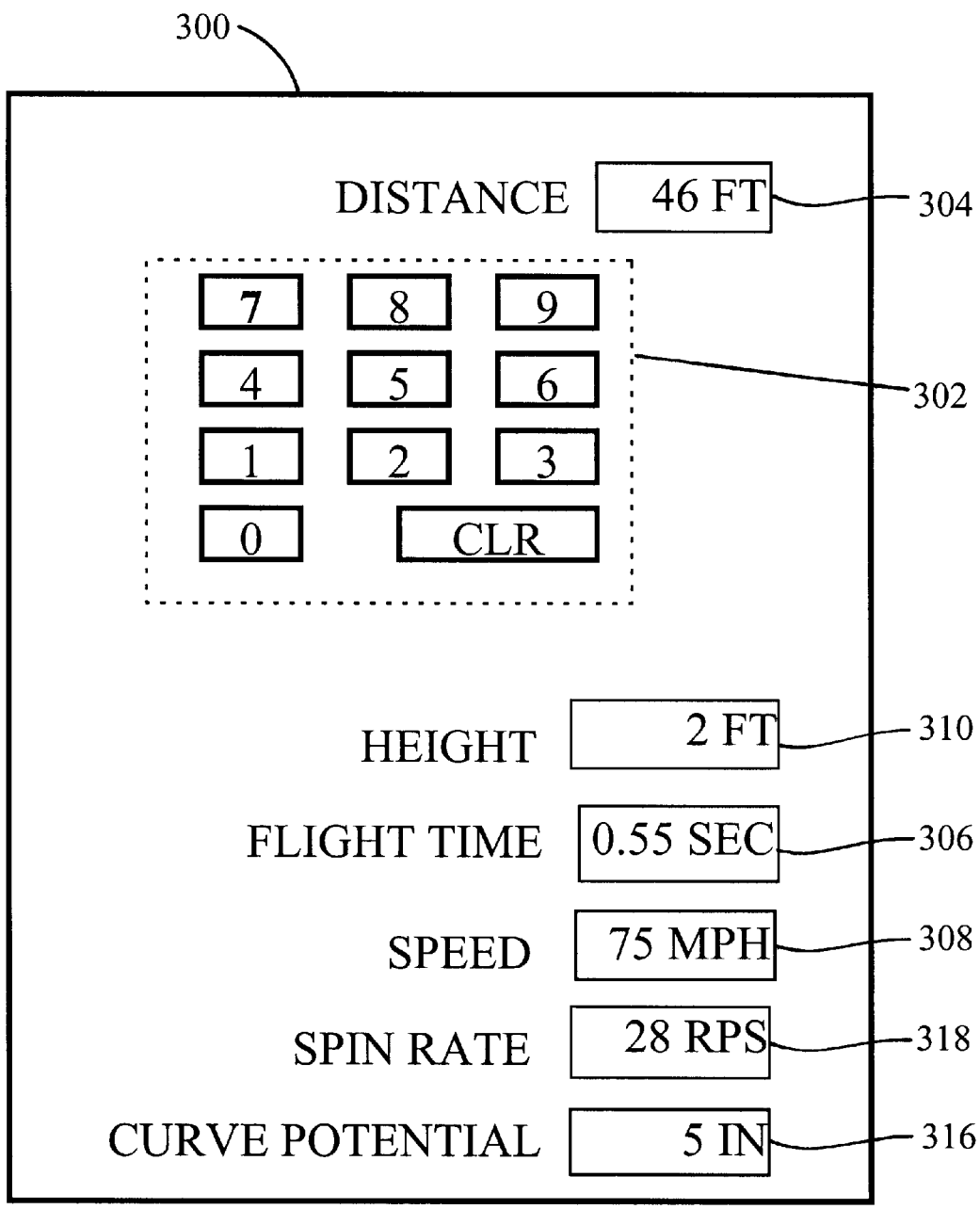
FIG. 3 shows an embodiment of the face of the monitor unit of the present invention.

FIG. 3 shows an embodiment of the face of the monitor unit of the present invention. Referring now to FIG. 3, face 300 of monitor unit 108 (FIG. 1) has numeric keypad 302 where the user may input information, such as the distance between a pitcher and a catcher. There are six displays. Distance display 304 shows the distance between two points, such as a pitcher and a catcher, that has been entered through numeric keypad 302. Time display 306 shows the time of flight of a movable object as calculated by monitor processor 112 (FIG. 1). Speed display 308 shows the speed of a movable object as calculated by monitor processor 112. Height display 310 shows the height of a movable object, such as a batted baseball or punted football, as calculated by monitor processor 112. Spin rate display 318 shows the revolutions per second of a movable object, such as a pitched baseball or thrown football, as calculated by monitor processor 112. Curve display 316 shows the potential lateral deflection in inches of a movable object, such as a pitched baseball, as calculated by monitor processor 112.

Monitor unit 108 can provide the trajectory height of a movable object such as a kicked football. Provided that the launch altitude is equivalent to the landing altitude (or reasonably so with respect to the trajectory height) the movable object trajectory's maximum altitude can be calculated by monitor unit 108 and displayed to the user.

The equation that describes the vertical distance covered by a falling object is given below:

$$d=(\tfrac{1}{2})at^2$$

where:

d=distance covered by the falling object (in inches)

a=acceleration due to gravity (32.2 feet/sec$^2$)

t=flight time—from the moment the object was released to the moment it hits the ground (in seconds)

It is also generally true that the fall time of an object that is catapulted is equal to its rise time. That is, the time it takes for a football to reach its maximum vertical height in a punt is equal to the time it takes for the ball to fall back to the ground, provided that the ball is received on the same stationary plane from which it was kicked, roughly about four feet off the ground. Hence, the vertical height h of a punted football with total air time $t_a$ is given by the following equation:

$$h=(\tfrac{1}{8})at_a^2$$

Figure 4:
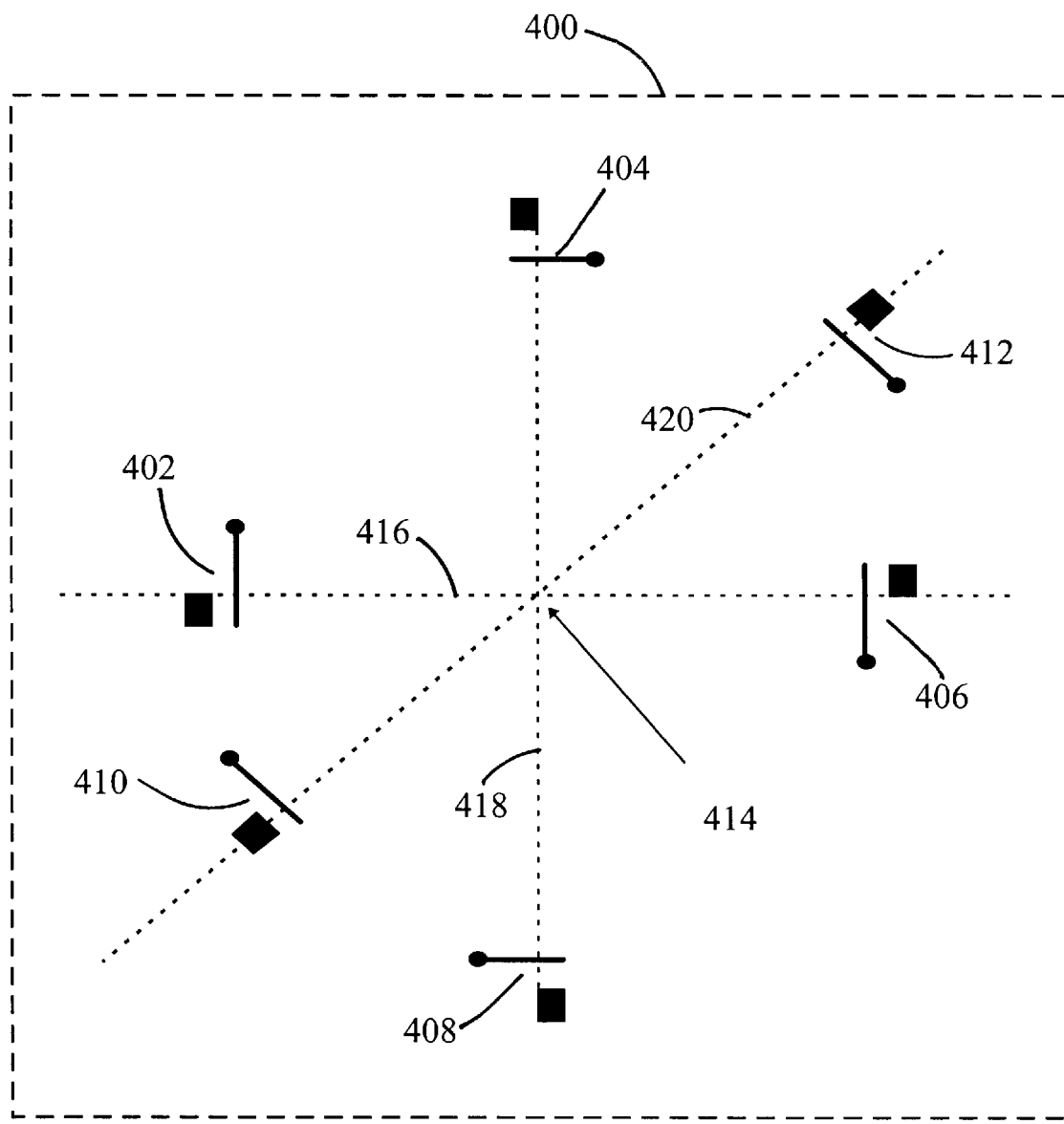
FIG. 4 shows a modified perspective view of an embodiment of a spin detection sensor network, which utilizes simple on/off mechanical g-force sensor switches, of the present invention.
Figure 7:
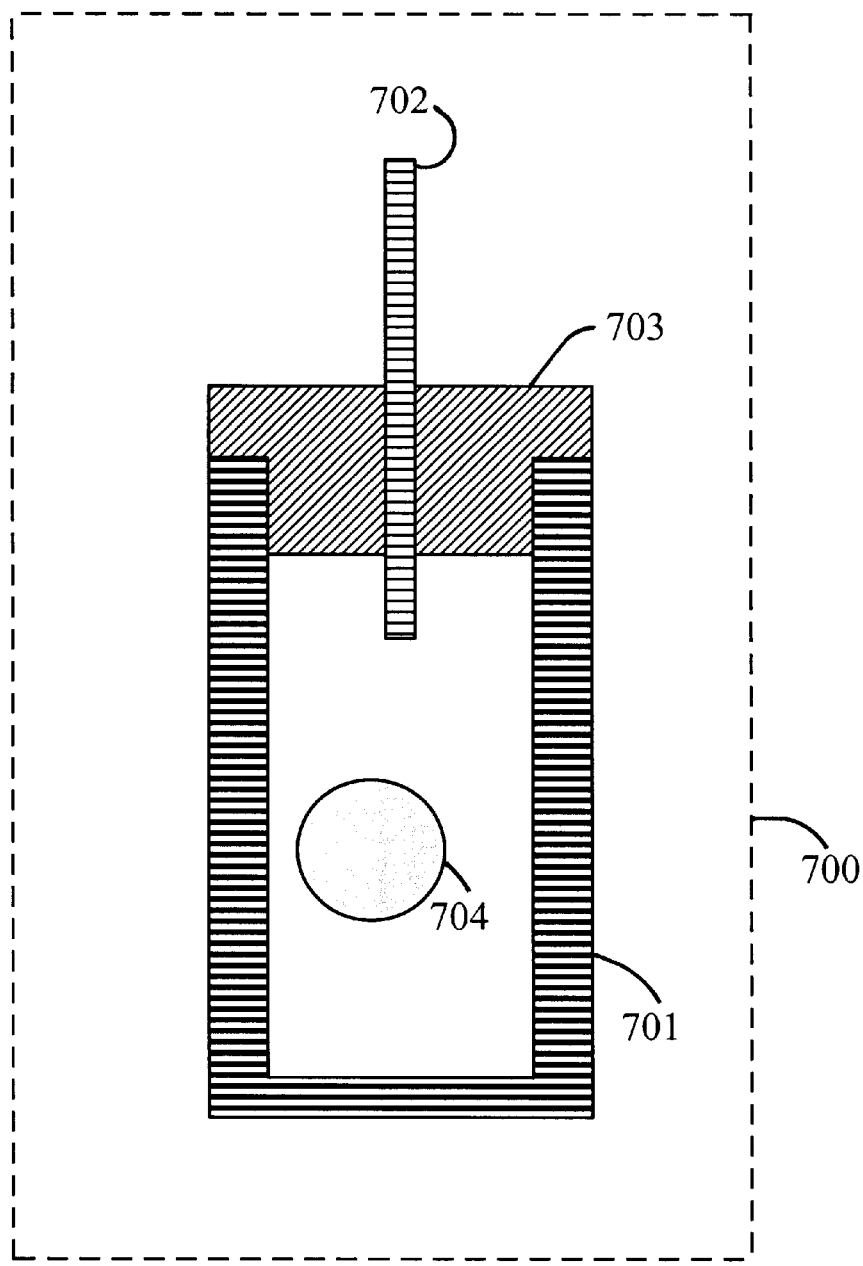
FIG. 7 shows in detail the common and prior art tilt switch used in FIG. 6.

FIG. 4 shows a modified perspective view of an embodiment of a spin detection sensor network, which utilizes simple on/off mechanical g-force sensor switches, of the present invention. The mechanical switch illustrated is representative of a number of various switches that can be used, such as a common mercury or metal ball tilt switch. Referring now to FIG. 4, spin detection sensor network 400 is embedded, secured, or attached in the center of a movable object, such as a baseball, and utilizes simple on/off mechanical g-force sensor switches. Spin detection sensor network 400 is designed to detect the spinning of the movable object about one or more internal axes that run through center of movable object 414. Each mechanical g-force sensor switch, of which there are several suitable common types, such as the tilt switch shown in FIG. 7, is activated whenever the switch experiences a centrifugal g-force in excess of its threshold value in its direction of sensitivity. With tilt switches, this threshold is negligible thus allowing for quick response. Mechanical g-force sensor switches 402 and 406 lie on a first axis 416. They are normally positioned equidistant from a center of movable object 414 for balance purposes but this is not required. Their directions of sensitivity are opposite of each other. The same is true for mechanical g-force sensor switches 404 and 408 which lie on a second axis 418, normally perpendicular to first axis 416, but could be at any angle greater than 0° to the first axis, and normally equidistant from center of movable object 414. Mechanical g-force sensor switches 404 and 408 are sensitive to g-forces normal to the first axis. Though it is possible to sense rotation of the ball about any axis with only mechanical g-force sensor switches 402 and 406 on first axis 416 and mechanical g-force sensor switches 404 and 408 on second axis 418, mechanical g-force sensor switches 410 and 412, located on third axis 420 and normally equidistant from center of movable object 414, may be added for additional sensitivity. Third axis 420 also passes through center of movable object 414 and is normally perpendicular to both first axis 416 and second axis 418, but could be at any angle greater than 0° to a plane containing the first and second axes. Mechanical g-force sensor switches 410 and 412 are sensitive to g-forces normal to the plane formed by the first and second axes.

The orientation of each sensor's direction of sensitivity is important. When each pair of sensors lie on the same axis and the center of rotation of the movable object lies between them, the orientation of sensitivity for each sensor pair must be opposite from each other. When this configuration exists, electronic processor circuit 104 (FIG. 1) determines that the movable object is spinning if:

1. both mechanical g-force sensor switches 402 and 406 are on due to centrifugal force, or
2. both mechanical g-force sensor switches 404 and 408 are on due to centrifugal force, or
3. both mechanical g-force sensor switches 410 and 412 are on due to centrifugal force, or
4. any combination of the above three conditions are true.

Acceleration events occurring due to translational movement of the movable object, such as that occurring in normal handling or bouncing, will be easily filtered out since for such events only one of the two opposing sensors along an axis will turn on.

Figure 5:
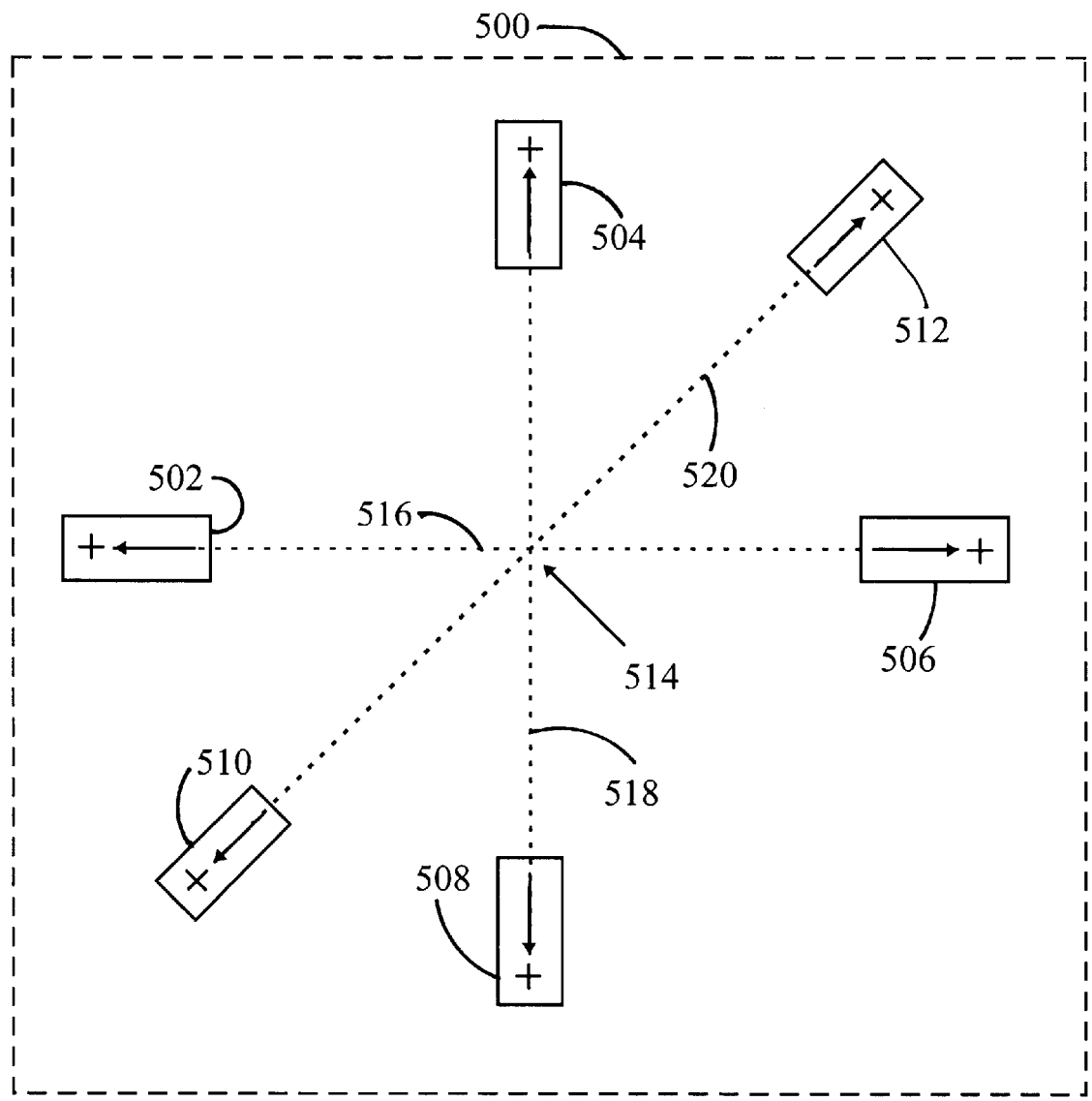
FIG. 5 shows a modified perspective view of an embodiment of a spin detection sensor network, which utilizes g-force proportional accelerometers, of the present invention.

FIG. 5 shows a modified perspective view of another embodiment of the present invention of a spin detection sensor network, which uses semiconductor g-force proportional output sensors. Referring now to FIG. 5, spin detection sensor network 500 is embedded, secured, or attached in the center of a movable object, such as a baseball, and utilizes g-force proportional output sensors that output a g-force proportional signal. The arrangement of g-force proportional output sensors would be the same as for the mechanical g-force sensor switches of FIG. 4.

Spin detection sensor network 500 is designed to detect or measure the spinning of the movable object about one or more internal axes that run through center of movable object 514. A g-force proportional output sensor, when experiencing no g-force, outputs a certain voltage, such as 2.5 volts. When the g-force proportional output sensor experiences a g-force, the voltage output either rises above or falls below the no g-force level depending upon its direction of sensitivity.

G-force proportional output sensors 502 and 506 lie on a first axis 516, are typically equidistant from center of movable object 514 for balance purposes, and their directions of sensitivity are opposite of each other. The same is true for g-force proportional output sensors 504 and 508 which lie on a second axis 518, and sense g-forces normal to the first axis 516. Though it is possible to sense rotation of the ball about any axis with only g-force proportional output sensors 502 and 506 on first axis 516 and g-force proportional output sensors 504 and 508 on second axis 518, g-force proportional output sensors 510 and 512, located on third axis 520, may be added for additional sensitivity. Sensors 510 and 512 sense g-forces normal to the plane formed by the first and second axes.

It is important that the positive direction of sensitivity (the voltage output change from zero g-force is positive for centrifugal force in this direction) for each sensor along the same axis be arranged in the opposite direction as shown in FIG. 5. Electronic processor circuit 104 determines that the movable object is spinning if:

1. both g-force proportional output sensors 502 and 506 give an indication of force in their respective positive directions, or
2. both g-force proportional output sensors 504 and 508 give an indication of force in their respective positive directions, or
3. both g-force proportional output sensors 510 and 512 give an indication of force in their respective positive directions, or
4. any combination of the above three conditions are true.

Again, acceleration events occurring due to translational movement of the movable object, such as that occurring in normal handling or bouncing, will be easily filtered out since for such events only one of the two opposing sensors will give a positive indication, and the other will give either no indication or a negative indication, depending on the type of sensor used.

Figure 6:
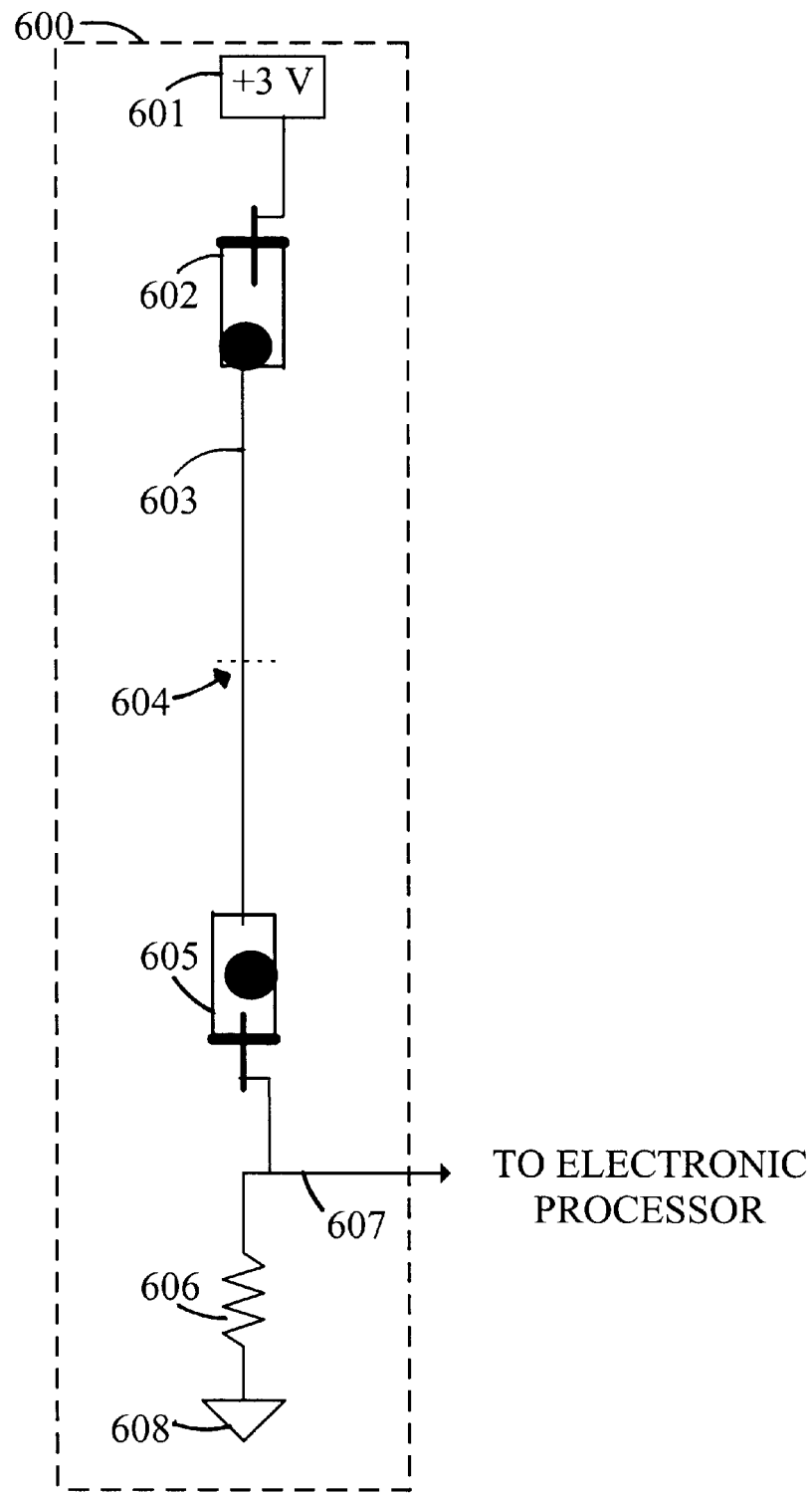
FIG. 6 shows a particular realization of the spin detection sensor network that uses tilt switches, of the present invention.

FIG. 6 illustrates a specific realization of the spin detection sensor network described in FIG. 4. Spin detection sensor network 600 has tilt switch 602 and tilt switch 605 diametrically opposed about center of rotation 604 of the movable object and secured to the movable object, connecting wire 603, resistor 606, 3 volt supply 601, and output signal 607 to electronic processor 104 (FIG. 1). Output signal 607 is pulled to +3 volts when the movable object spins, otherwise it is at ground potential 608.

FIG. 7 illustrates a cross-section of a common prior art tilt switch 700 which comprises two electrically conductive connections, pin 702 and case 701 separated by insulator 703. The tilt switch is on (activated) when conductive ball 704 provides electrical continuity between case 701 and pin 702, and is off otherwise.

Referring to FIG. 6, tilt switches 602 and 605 both activate only when centrifugal forces resulting from spinning of the movable object about center of rotation 604 push the conductive balls outward from center of rotation 604. When both tilt switches activate, spin detection sensor network 600 outputs an active high SPIN signal to electronic processor 104.

Figure 8:
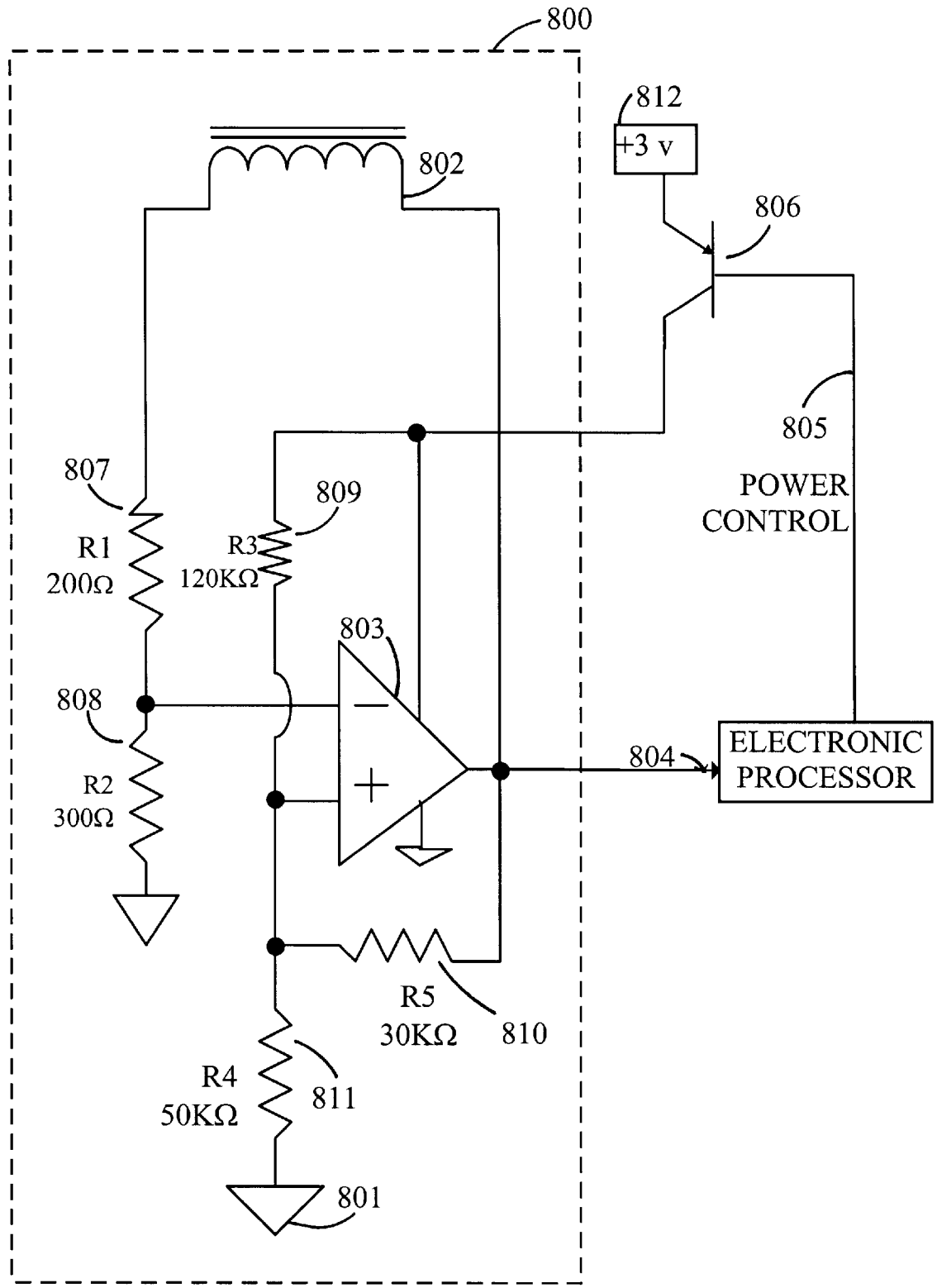
FIG. 8 shows a magnetoinductive sensor, which is a articular realization of a magnetic field sensor.

FIG. 8 illustrates a specific realization of magnetic field sensor 118 of FIG. 1. Those skilled in the art will recognize magnetoinductive sensor 800 as a common inductor/resistor (L/R) relaxation oscillator.

Magnetoinductive sensor 800 comprises voltage comparator integrated circuit 803, such as a National Semiconductor Corporation LM339; inductive sensor coil 802; resistors 807, 808, 809, 810, and 811; and output signal 804. Output signal 804 is monitored by electronic processor 104 (FIG. 1). Power control signal 805 is used by the electronic processor 104 to control the application of 3 volt power to the magnetoinductive sensor circuit through PNP transistor 806. When electronic processor 104 pulls power control signal 805 to ground potential 801, magnetoinductive sensor 800 is powered.

Magnetoinductive sensor 800 is an L/R relaxation oscillator where inductance L is the inductance of sensor coil 802 and resistance R is determined by the value of resistors 807 and 808. The frequency of the output 804 is proportional to L/R. Inductance L and the frequency of oscillator output 804 vary as the orientation of sensor 802 varies with respect to the earth's magnetic field. When the longitudinal axis of sensor coil 802 is parallel to the earth's magnetic field, the inductance of coil 802 is maximum. When the longitudinal axis of sensor coil 802 is antiparallel to the earth's magnetic field, the inductance of coil 802 is minimum. Hence the degree of alignment of sensor coil 802 with the earth's magnetic field can be deduced from the frequency of output signal 804.

Figure 9:
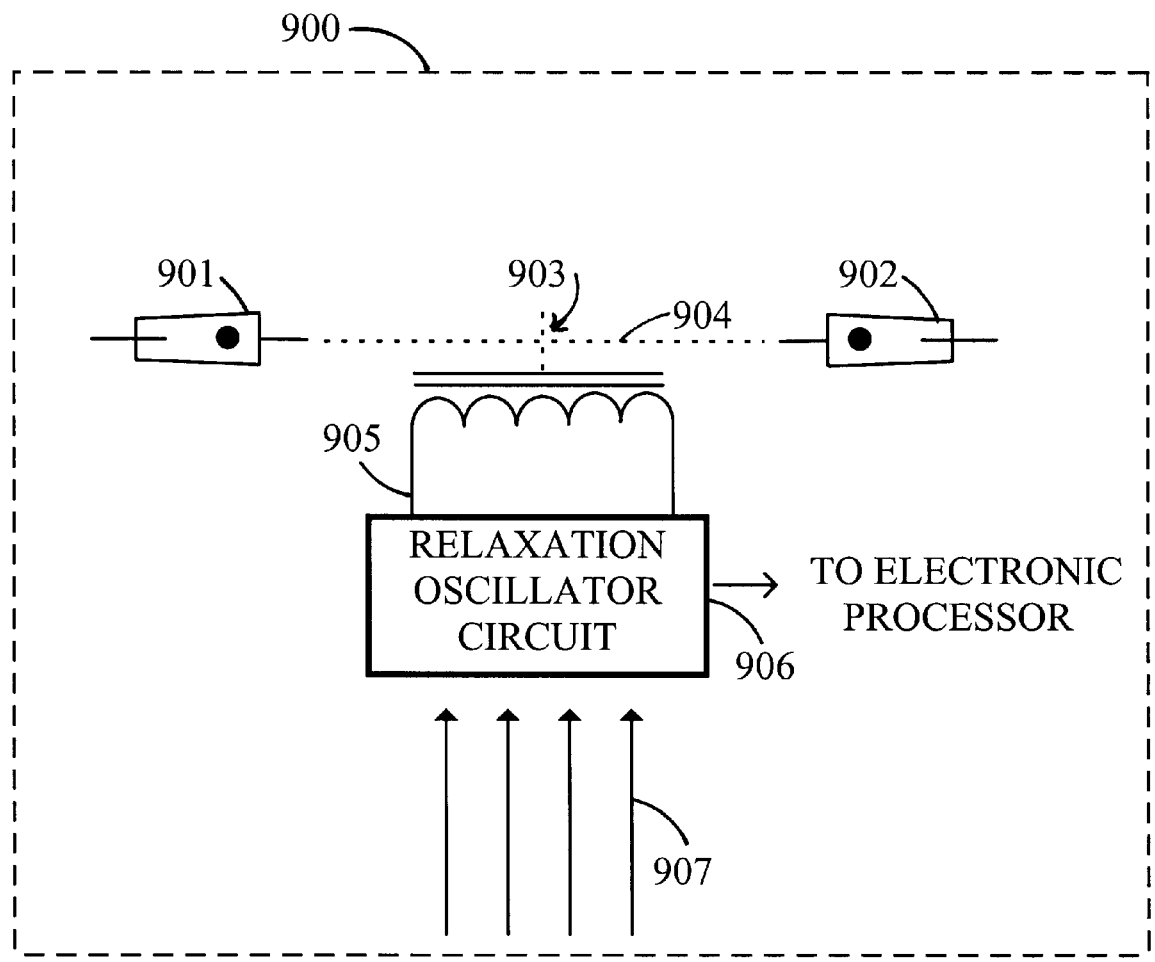
FIG. 9 shows part of the internals of an object unit with a spin detection sensor network in conjunction with a magnetoinductive magnetic field sensor, of the present invention.

FIG. 9 illustrates spin detection network switches 901 and 902 and magnetoinductive field sensor comprising coil 905 and circuit 906. All elements are secured to the movable object. External lines of force representing the earth's magnetic field are depicted by 907. If the movable object rotates about center point 903 such that the axis 904 remains in the plane of the illustration, the varying angles formed by the longitudinal axis of coil 905 with external magnetic field force lines 907 will result in a corresponding variation in the inductance of coil 905 and a consequent change in the output frequency of relaxation circuit 906. The longitudinal axis of coil 905 is along the center of the wound coil. In FIG. 9, the longitudinal axis is shown parallel to the line 904. The changes in output frequency are indicative of changes of alignment between the movable object and the earth's magnetic field and are monitored by electronic processor 104. Electronic processor 104 determines the time it takes for the movable object to make one revolution. From this raw rotation period information, the spin rate is calculated.

If the movable object rotates about axis 904, the orientation of the longitudinal axis of coil 905 will not be changing with respect to the external magnetic field. This means that the coil's inductance will not be changing as the movable object rotates and, hence, spin rate determination will not be possible. In addition, mechanical switch network comprising switches 901 and 902 will not activate. To address this problem, it is useful to add another pair of mechanical switches to the spin detection sensor network and to add a second magnetic field sensor coil as described below with respect to FIG. 10.

Figure 10:
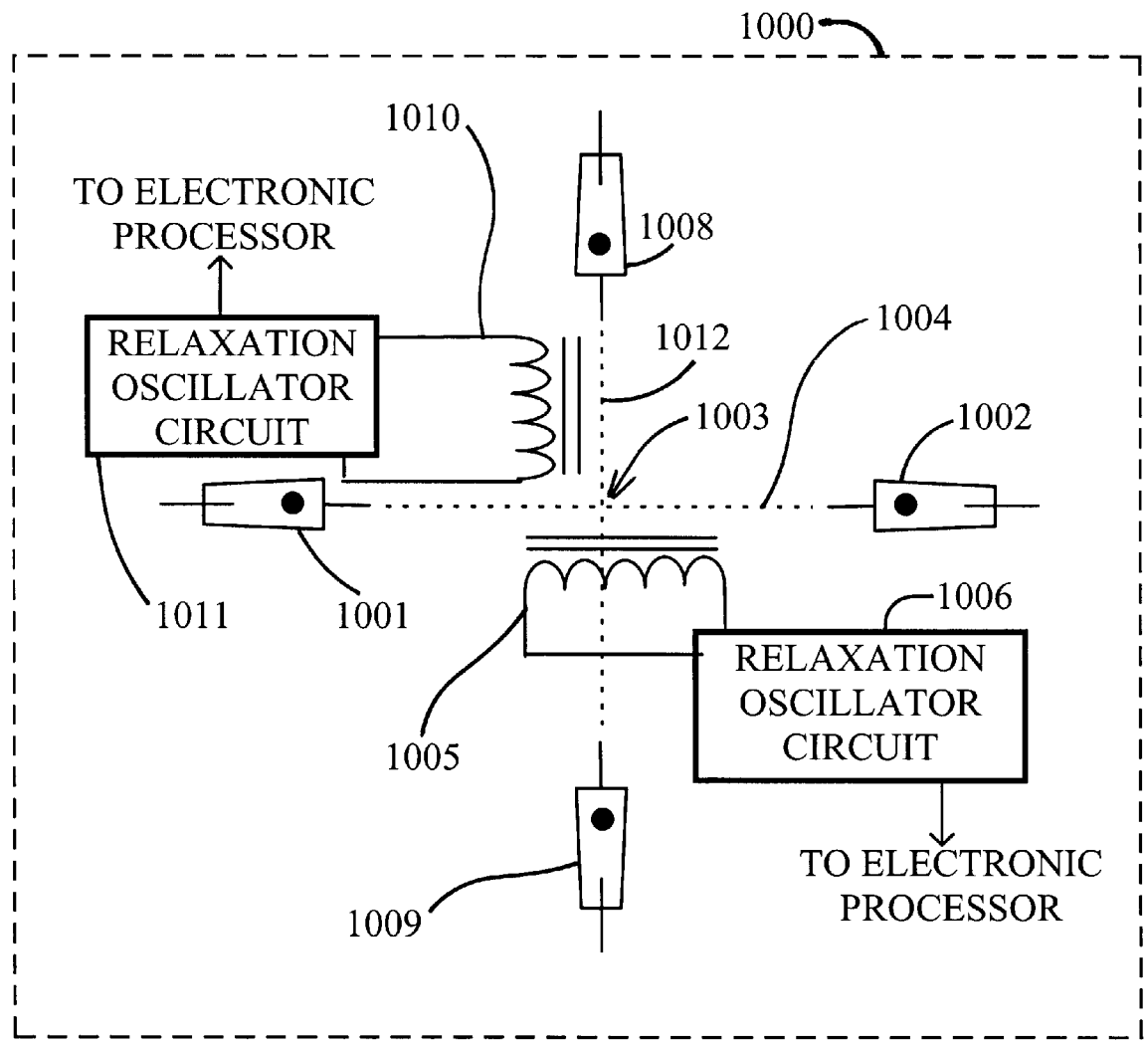
FIG. 10 shows part of the internals of an object unit with a two axes spin detection sensor network in conjunction with two orthogonal magnetoinductive magnetic field sensors, of the present invention.

Referring now to FIG. 10, the second pair of mechanical switches are shown as tilt switches 1008 and 1009. The second magnetoinductive sensor is shown as coil 1010 and relaxation oscillator 1011.

FIG. 10 shows sensor coil 1010 perpendicular to sensor coil 1005. This is an optimal, but not necessary, orientation. It is necessary, however, that coil 1005 and coil 1010 not be parallel. The same is true for mechanical switches 1008 and 1009. They are optimally lying along a line that is perpendicular to line 1004. There is no required relationship between the orientation of the mechanical switches of the spin detection sensor network and the two magnetic sensor coils. They are shown here along common axes for convenience.

Figure 11:
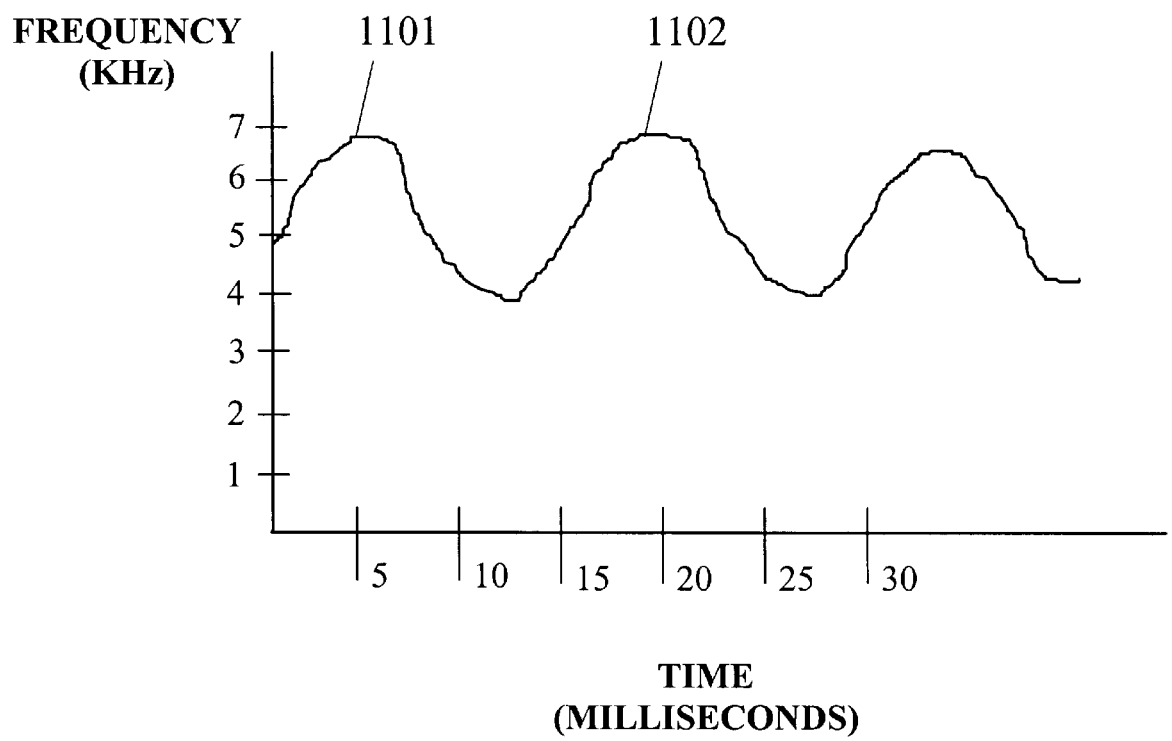
FIG. 11 shows a frequency versus time graph of the output of a magnetoinductive field sensor that is embedded within a spinning object, of the present invention.

FIG. 11 illustrates the output of one of the magnetoinductive sensors as it is rotating through the earth's magnetic field and is subjected to varying angles of alignment with that external magnetic field. The graph shows the output frequency in kilohertz versus time. The output frequency peak at point 1101 and the peak at point 1102 mark the beginning and end of a complete 360 degree rotation of the movable object. The electronic processor 104 (FIG. 1) that measures the interval between peaks can calculate the spin rate of the object. For example, if the time between points 1101 and 1102 is 0.04 seconds, the spin rate is 25 revolutions per second. If two perpendicular magnetic field sensors are used as in FIG. 10, the measurement is best made from the sensor output providing the greatest variation of frequency over a rotation period.

Figure 12:
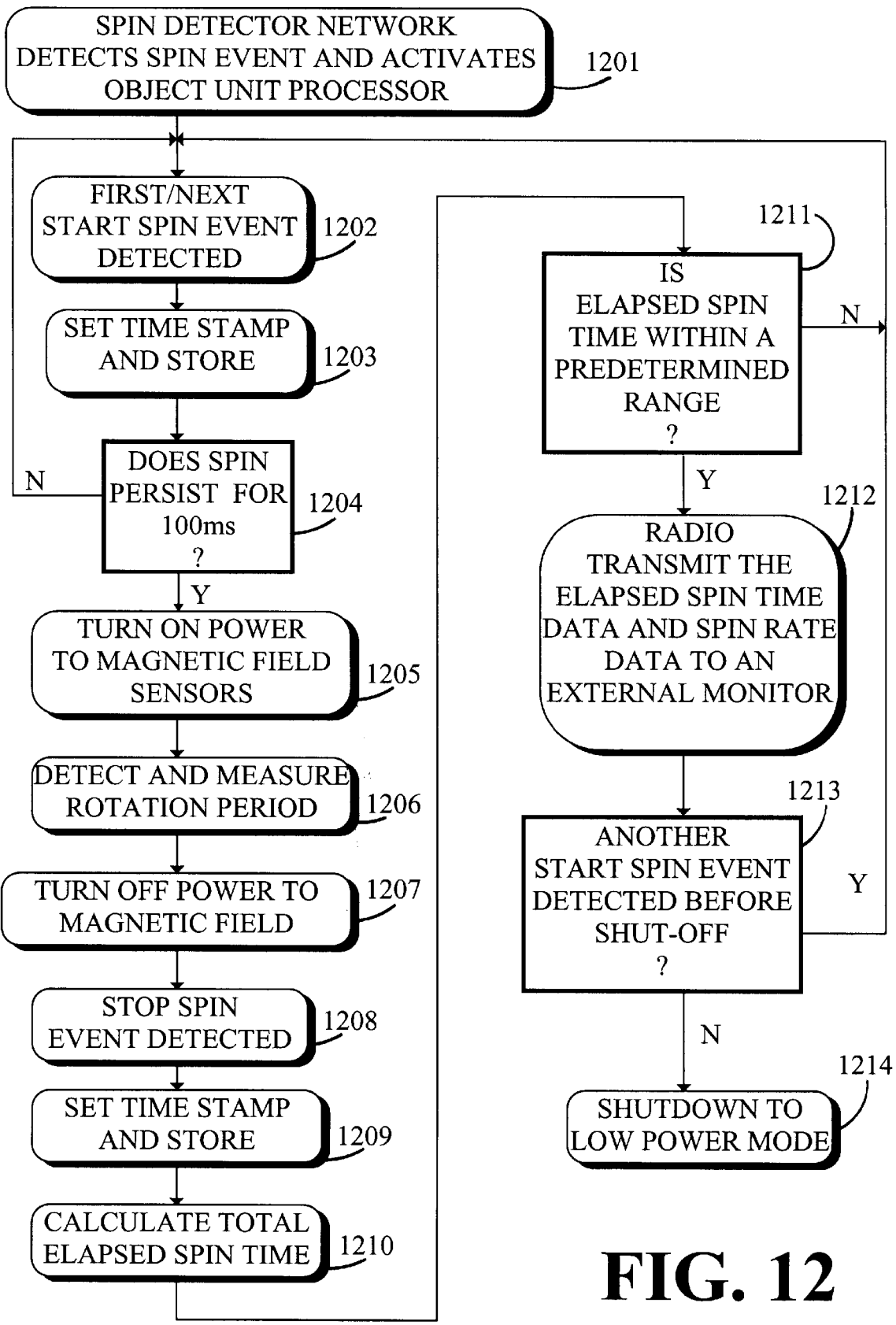
FIG. 12 shows a flowchart of an embodiment of the invention depicting object unit behavior for detecting spin, operating the magnetic field sensors, measuring elapsed spin time, measuring spin rate, and transmitting data to the monitor unit.

FIG. 12 shows a flowchart of the preferred embodiment of the invention for operating the magnetic field based spin meter. Referring to FIG. 12, electronic processor 104 (FIG. 1) is initially in a shutdown state for low power consumption. In step 1201 spin detector network 102 (FIG. 1) is activated. This activation consequently activates electronic processor 104. In step 1202 processor 104 detects the spin indication. In step 1203, a time stamp is set and stored in a first position in electronic processor circuit 104 (FIG. 1).

If the spinning does not persist for 100 milliseconds, step 1204 returns control to step 1202. Step 1204 is an optional step that can be used to filter out short, incidental, spin events that are not of interest so that power is not supplied to the magnetoinductive sensors for such spin events. If spinning does persist for 100 milliseconds, control passes to step 1205 where processor 104 (FIG. 1) turns on power to magnetic field sensors 118 (FIG. 1). In step 1206, processor 104 monitors the magnetoinductive sensors' outputs for periodic fluctuations in the sensors' output frequency due to rotations of the movable object within the earth's magnetic field. The period is measured by electronic processor 104 and stored in a second position in electronic processor 104. Power to magnetic field sensors 118 is then turned off in step 1207.

In step 1208 of FIG. 12 processor 104 detects that spin detection sensor network 102 (FIG. 1) output is inactive, indicating that spinning has stopped. In step 1209 a time stamp is set and stored in a third position in electronic processor circuit 104 (FIG. 1).

In step 1210, the processor calculates the elapsed spin time by subtracting the time stamp stored in the first position of the processor from the time stamp stored in the third position of the processor.

In step 1211, an optional check is made by the processor to see whether the elapsed spin time falls within a predetermined range appropriate for the application. For instance, for the case in which the movable object is a pitched baseball, the elapsed spin time should be between 0.2 and 1.0 seconds. If the spin time is within the predetermined range, control passes to step 1212. If the elapsed spin time is outside of the predetermined range, the spin is probably not caused by a toss so it is ignored and control passes back to step 1202.

In step 1212, the processor transmits the elapsed spin time and the rotation period information (stored in the second processor position) using radio transmitter 106 (FIG. 1). Of course, the processor could first process the raw motion data to derive the movable object's speed in miles per hour and spin rate in revolutions per second and then transmit the derived data to the external monitor unit 108 (FIG. 1). In an alternative embodiment shown as object unit 200 (FIG. 2), instead of transmitting the motion data to the external monitor in step 1212, the derived speed and spin rate would be calculated and displayed on LCD display 219 (FIG. 2).

In step 1213, the processor measures the time since the last spin event. If this time exceeds a threshold such as 2 minutes, control passes to step 1214 where the processor goes to sleep in a low power shutdown state. If another spin event occurs before the shutdown time-out, control returns to step 1202.

Figure 13:
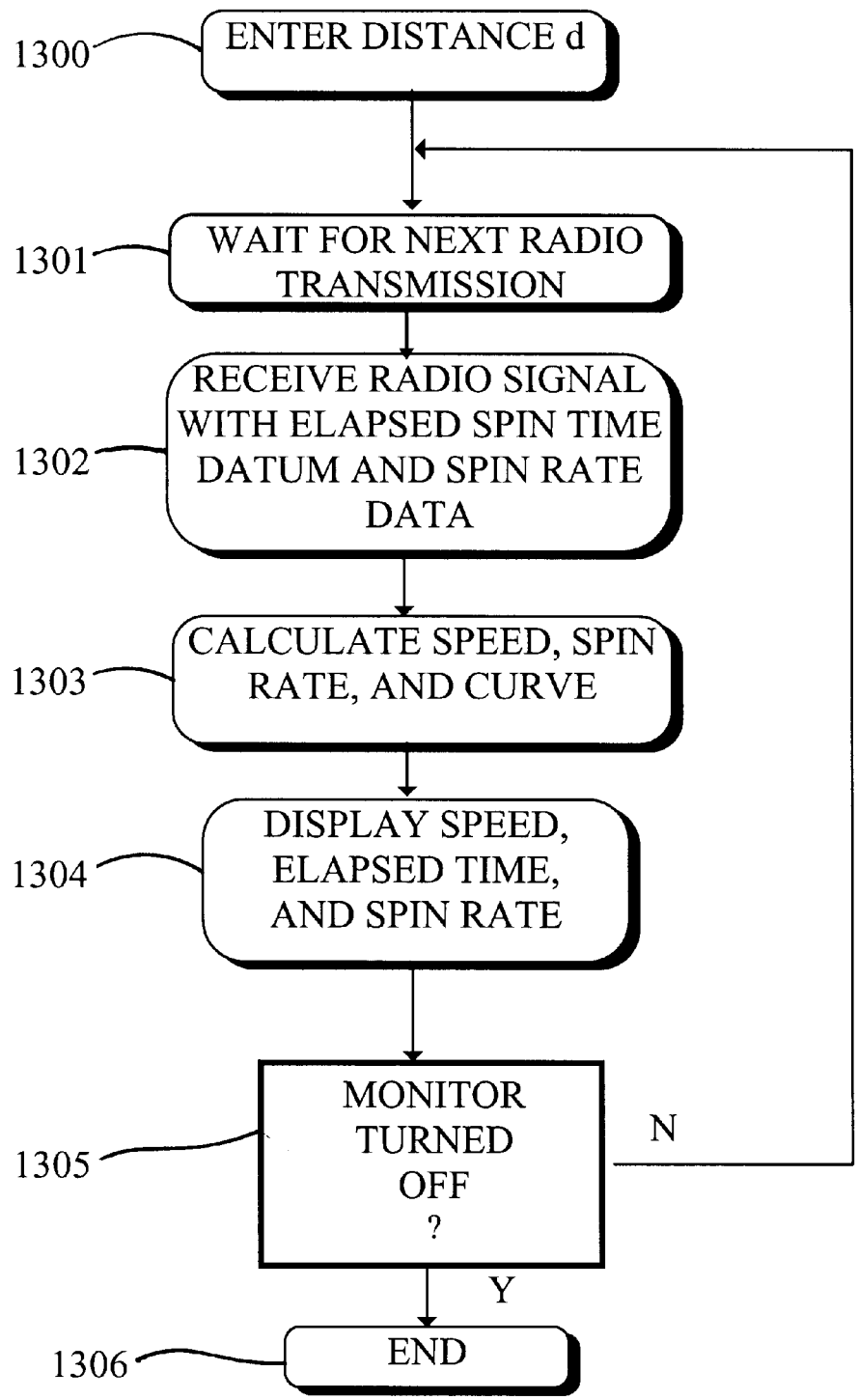
FIG. 13 shows a flowchart of an embodiment of the invention depicting monitor unit behavior for receiving spin time and spin rate data, making necessary calculations, and displaying the results to the user.

FIG. 13 shows a flowchart of an embodiment of the invention where monitor unit 108 (FIG. 1) receives from radio transmitter 106 (FIG. 1) a radio transmission containing a datum indicating the elapsed spin time and a datum representing the spin rate or rotation period.

Referring to FIG. 13, in step 1300, the user enters through the numeric keypad 302 (FIG. 3) the distance d between two points where characteristics of the movable object containing object unit 100 (FIG. 1) are desired to be measured. For a baseball pitch the distance between the pitcher and catcher would be entered.

In step 1301 radio receiver 110 (FIG. 1), which is tuned to the same frequency as radio transmitter 106 (FIG. 1), waits for the start of a radio signal from radio transmitter 106. Once the signal begins, control passes to step 1302 where radio receiver 110 receives from radio transmitter 106 a modulated radio signal from step 1212 of FIG. 12 containing a datum indicating the elapsed time of a spin event and a datum representing the rotational period during the spin event. In step 1303 the distance d from step 1300 is divided by the elapsed spin time from step 1302 to determine the average speed of the movable object, and using the rotational period, the spin rate of the movable object is calculated. The potential for lateral deflection of a movable object, like a baseball, can also be calculated, and is referred to as 'curve'.

Lateral deflection is deflection of the movable object away from the path that the movable object would traverse in a vacuum. The lateral force that the air turbulence immediately surrounding a thrown spinning ball exerts on the ball is commonly referred to as the Magnus force or the Magnus effect. The potential for lateral deflection can be calculated by using a spinning ball's speed, spin rate, and distance covered statistics.

The lateral deflection that is calculated may not be realized by the pitcher as horizontal 'curve' since this requires an optimal orientation of the ball's axis of rotation with respect to the direction of flight. Hence, the use of the word "potential." For instance, the lateral deflection resulting from top spin causes a ball to sink faster toward the ground. The lateral deflection resulting from back spin causes a ball to resist dropping toward the ground.

The curve displayed on the monitor would be updated only when the speed and spin rate displays are updated, as described above. The curve may be expressed in inches of lateral deflection of the ball at the point at which the ball is caught. According to published sources ("The Lateral Force on a Spinning Sphere: Aerodynamics of a Curveball," by Robert G. Watts and Ricardo Ferrer, American Journal of Physics 55:pp. 40–44, 1987; "Effect of Spin and Speed on the Lateral Deflection (Curve) of a Baseball and the Magnus Effect for Smooth Spheres," by Lyman J. Briggs, American Journal of Physics 27:pp. 589–596,1959; "The Physics of Baseball, $2^{nd}$ Edition," by Robert K. Adair, HarperPerennial, 1994) the deflection of a baseball due to Magnus force is given by the following equation:

$$d=KL^2\omega/2mV$$

where:
  d=deflection in meters
  K=a constant of $7\times10^{-5}$ kilograms
  L=the distance of the ball's flight in meters
  $\omega$=rotation rate in radians/second, this is equal to $2\pi R$ where R is the spin rate
  m=mass of the ball in kilograms
  V=translational velocity of the ball in meters/second For a distance L of 59 feet (18 meters), a rotation rate of 1900 rpm (199 radians/second), a baseball of standard 5.125 ounces (0.145 kilograms), and an average translational velocity of 75 MPH (33.5 meters/second), the potential lateral deflection due to the Magnus force is 18.3 inches (0.46 meters). Of course, whether this lateral deflection will be realized depends on the orientation of the ball's axis of rotation with respect to the direction of flight. Using the same statistics except that the speed of the pitch is increased to a 'fast ball' of 90 MPH and the rotation rate is decreased to 1600 rpm, the potential lateral deflection is 12.8 inches (0.33 meters).

Referring again to FIG. 13, in step 1304 the results of the calculations are displayed to the user on monitor display 114 (FIG. 1). If the monitor is turned off, control passes to step 1306; otherwise, control returns to step 1301 where the next data transmission is awaited.

Figure 14:
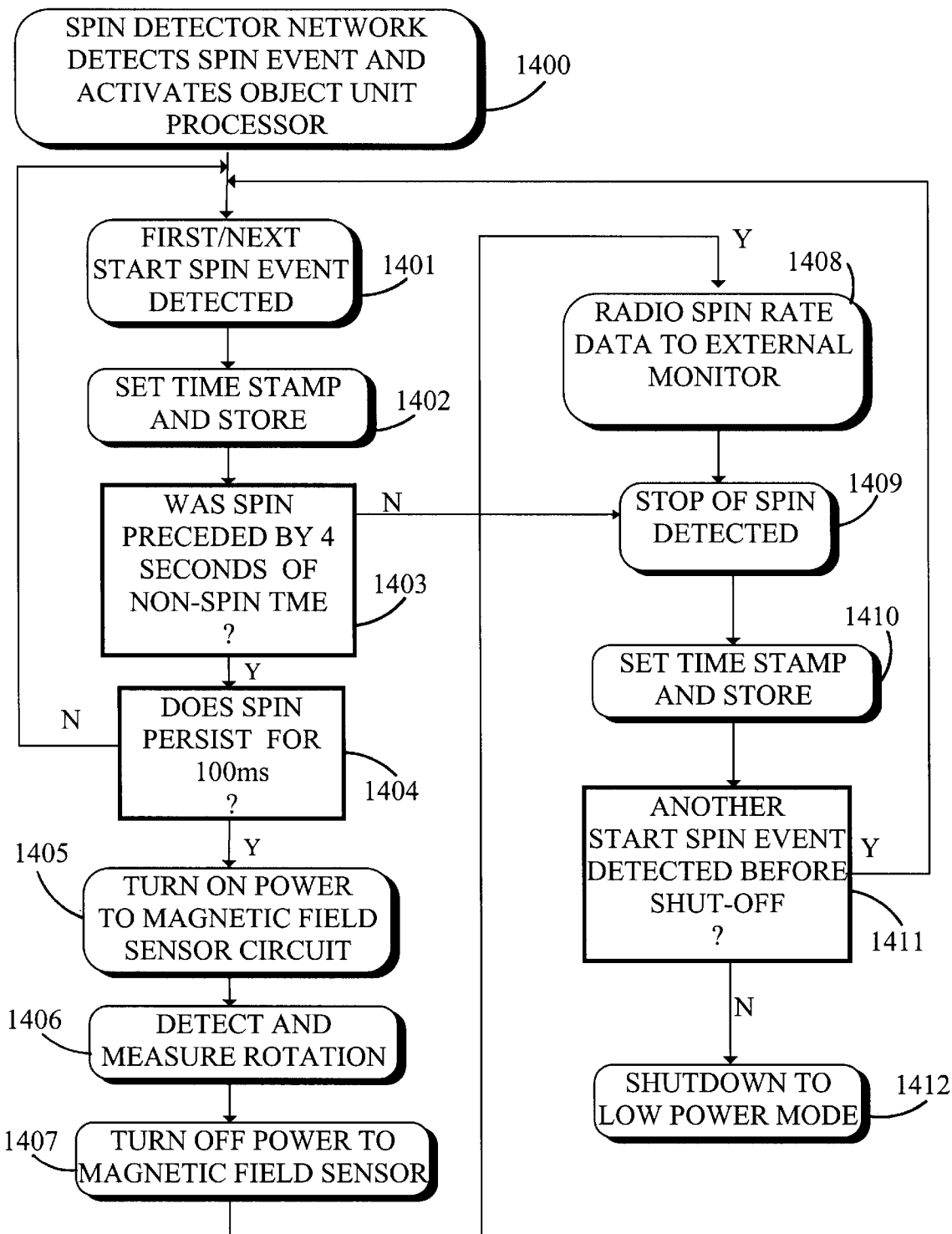
FIG. 14 shows a flowchart of an embodiment of the invention depicting object unit behavior for detecting spin, operating the magnetic field sensors, measuring elapsed spin time, measuring spin rate, and transmitting data to the monitor unit when the object unit transmits spin rate data as soon as it is known.

FIG. 14 shows a flowchart of an embodiment of the invention that is more appropriate than FIG. 13 for application of the invention to measuring the spin rate of a soccer ball or bowling ball. The main difference between FIG. 14 and FIG. 12 is that the spin rate data is transmitted to the monitor unit as soon as the data is known rather than as soon as the spinning stops. This technique is more appropriate because, unlike a pitcher tossing a baseball to a catcher, there is commonly nobody to receive or stop the kicked soccer ball. The ball may continue to spin until it is out of radio range of the monitor unit which is worn by the kicker of the soccer ball.

In FIG. 14 electronic processor 104 (FIG. 1) is initially in a shutdown state for low power consumption. In step 1400 spin detector network 102 (FIG. 1) is activated and it activates electronic processor 104 (FIG. 1). In step 1401 electronic processor 104 detects the spin indication. In step 1402 a time stamp is set and stored in a first position in electronic processor 104.

In step 1403, a check is made as to whether the current spin event was preceded by 4 seconds of non-spin time. This predetermined period of non-spin time may vary depending upon the type of movable object the object unit 100 is embedded within. Typically, the predetermined period of time would be several seconds. This is to filter out (ignore) spin events that are not of interest. For example, if there were no requirement for 4 seconds of non-spin time, then a soccer ball that strikes a net, and stops spinning for ¼ of a second before it starts spinning again when it falls from the net, would transmit again.

The non-spin time is determined by taking the time stamp in the second position in electronic processor 104 that was set at the end of the previous spin event in step 1410 and subtracting it from the time stamp in the first position in electronic processor 104 that was set at the start of the current spin event. The resulting value is the non-spin time. If step 1403 determines that the spin event was not preceded by the predetermined period of non-spin time, no spin rate measurement is done and control skips forward to step 1409. If step 1403 determines that the spin event was preceded by the predetermined period of non-spin time, then control passes to step 1404.

If the spinning persists for 100 milliseconds, control passes from step 1404 to step 1405; otherwise control returns to step 1401.

In step 1405, power is supplied to magnetic field sensors 118 (FIG. 1). In step 1406 the electronic processor 104 (FIG. 1) monitors the output of the magnetic field sensors 118 (FIG. 1), detects periodicity, and measures the rotation period. Once the measurements are made, the power to the magnetic field sensors is turned off to conserve battery power in step 1407 and, in step 1408, the spin rate data is radio transmitted to the external monitor unit.

When stop of spin is detected in step 1409, a time stamp is set and stored in a second position in electronic processor 104 (FIG. 1) in step 1410. This time stamp is used upon the next spin event to determine the amount of non-spin time between spin events.

In step 1411, the processor measures the time since the last spin event. If the elapsed time exceeds a time-out threshold such as 2 minutes, control passes to step 1412 where the processor goes to sleep in a low power shutdown state. If another spin event occurs before the shutdown time-out, control returns to step 1401.

Figure 15:
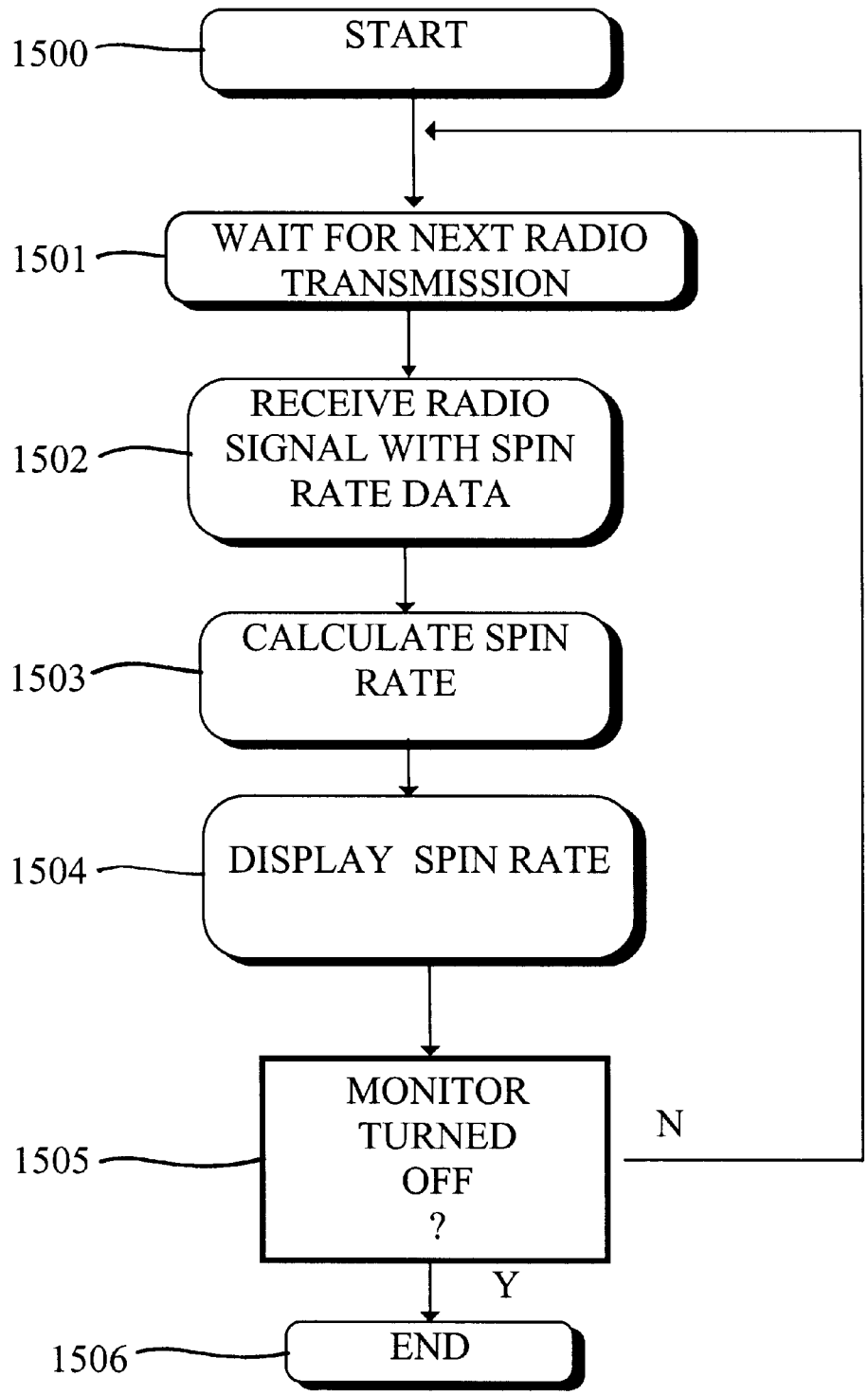
FIG. 15 shows a flowchart of an embodiment of the invention depicting monitor unit behavior for receiving spin rate data, making necessary calculations, and displaying the results to the user.

FIG. 15 shows a flowchart of an embodiment of the invention where monitor unit 108 (FIG. 1) receives from radio transmitter 106 (FIG. 1) a radio transmission containing a datum representing the spin rate or rotation period. This radio transmission would be from the transmit step in FIGS. 14 and 20. The FIG. 15 flowchart is identical to the FIG. 13 flowchart except that no distance is entered by the user, the elapsed spin time datum is not received, and the movable object's speed is not calculated.

Referring now to FIG. 15, control starts at step 1500 and passes to step 1501 where radio receiver 110 (FIG. 1), which is tuned to the same frequency as radio transmitter 106 (FIG. 1), waits for the start of a radio signal from radio transmitter 106. Once the signal begins, control passes to step 1502 where radio receiver 110 receives from radio transmitter 106 a modulated radio signal from step 1408 of FIG. 14 or step 2008 of FIG. 20 containing a datum representing the rotational period during the spin event. In step 1503, the spin rate of the movable object is calculated using the rotational period. The potential for lateral deflection, or 'curve', of a movable object, like a baseball, can also be calculated as described above. In step 1504, the results of the calculations are displayed to the user on monitor display 114 (FIG. 1). If the monitor is turned off, control passes to step 1506; otherwise, control returns to step 1501 where the next data transmission is awaited.

Figure 17:
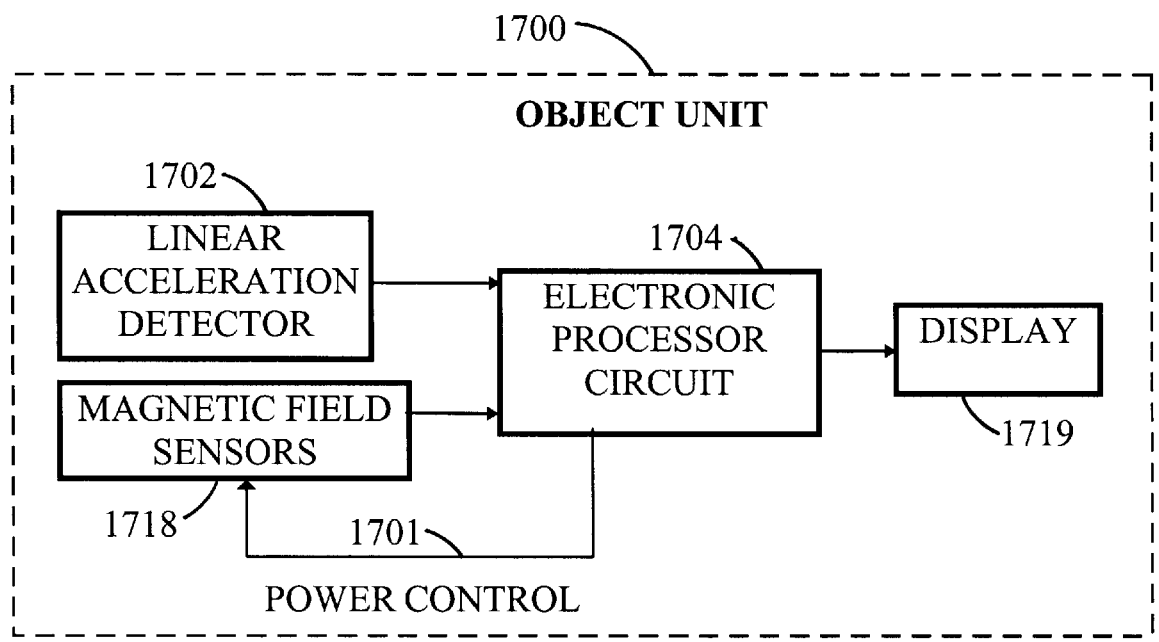
FIG. 17 shows a block diagram of the object unit for a device for measuring the speed, spin rate, and curve of a movable object of the present invention using a linear acceleration detector and an object unit with an attached display and no monitor unit.
Figure 18:
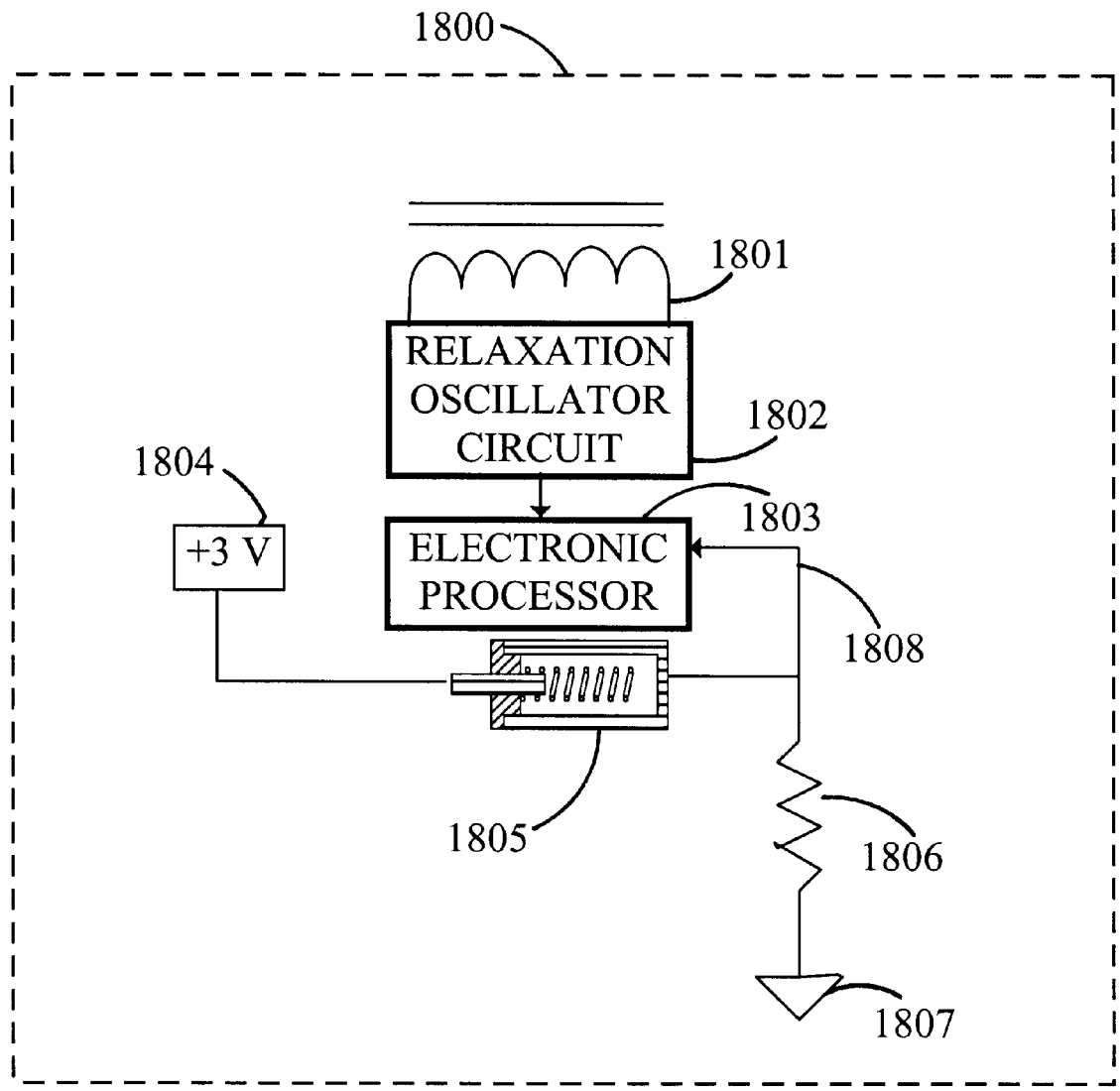
FIG. 18 shows part of the internals of an object unit with a linear acceleration detector in conjunction with a magnetoinductive magnetic field sensor, of the present invention.
Figure 19:
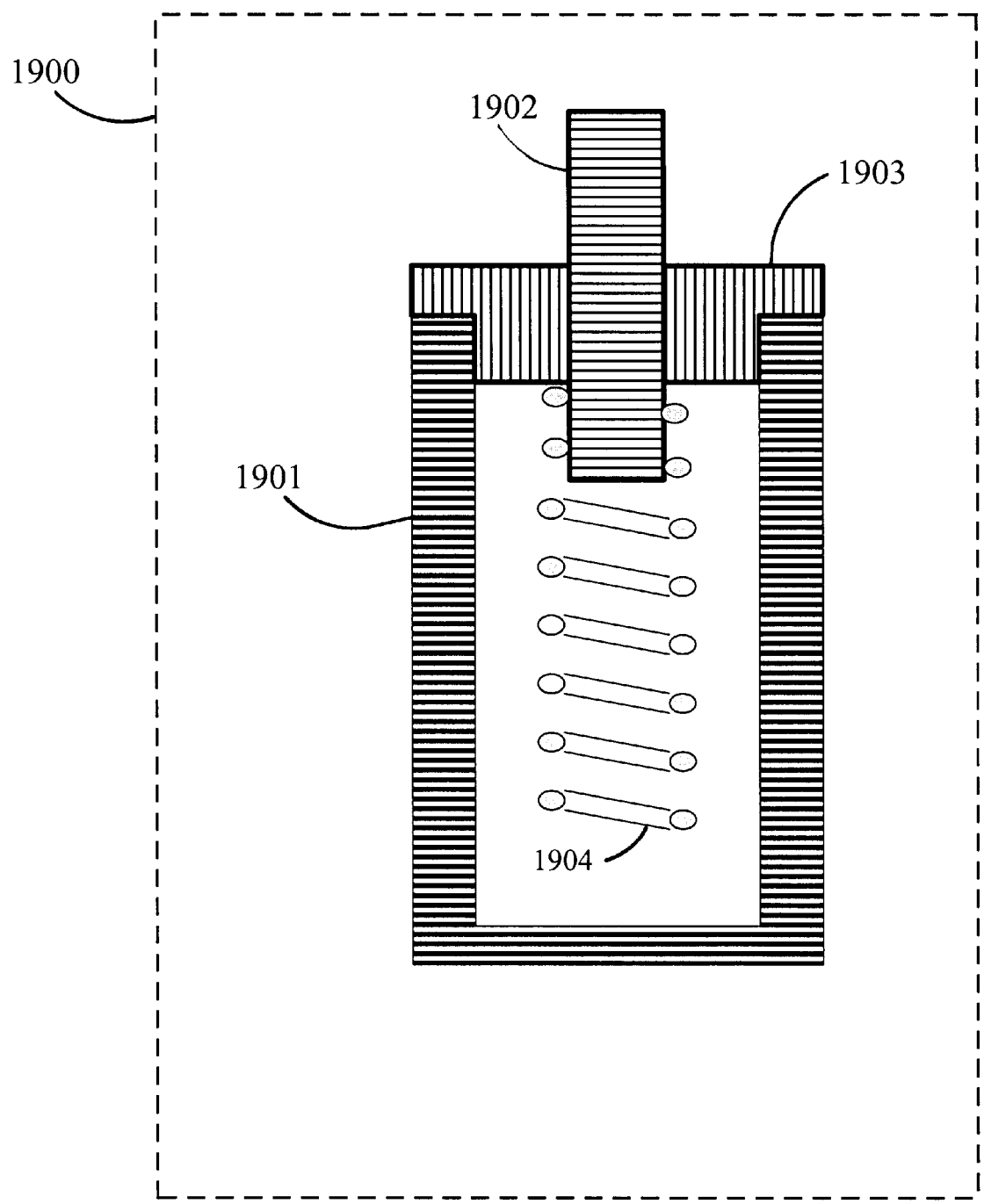
FIG. 19 shows a particular realization of the linear acceleration detector that is prior art.

FIGS. 16 through 20 illustrate a second embodiment of the invention. In these figures power is supplied to the magnetic field sensors in response to an indication from an inertial switch. An inertial switch is a simple mechanical switch that activates in response to linear acceleration of the movable object rather than in response to spinning. An example of such an inertial switch is given in U.S. Pat. No. 5,786,553 by Zakutin and is illustrated in FIG. 19. When the movable object such as a baseball undergoes linear acceleration such as that resulting from swinging the ball in your hand for a toss or dropping it against the ground, power would be supplied to the magnetic field sensor and its output would be monitored for changes in frequency indicative of spinning. Unlike the preferred embodiment, power is possibly supplied to the magnetic field sensors when the ball is not spinning. However, if no magnetic field strength fluctuations are sensed, power to the sensors is removed.

Figure 16:
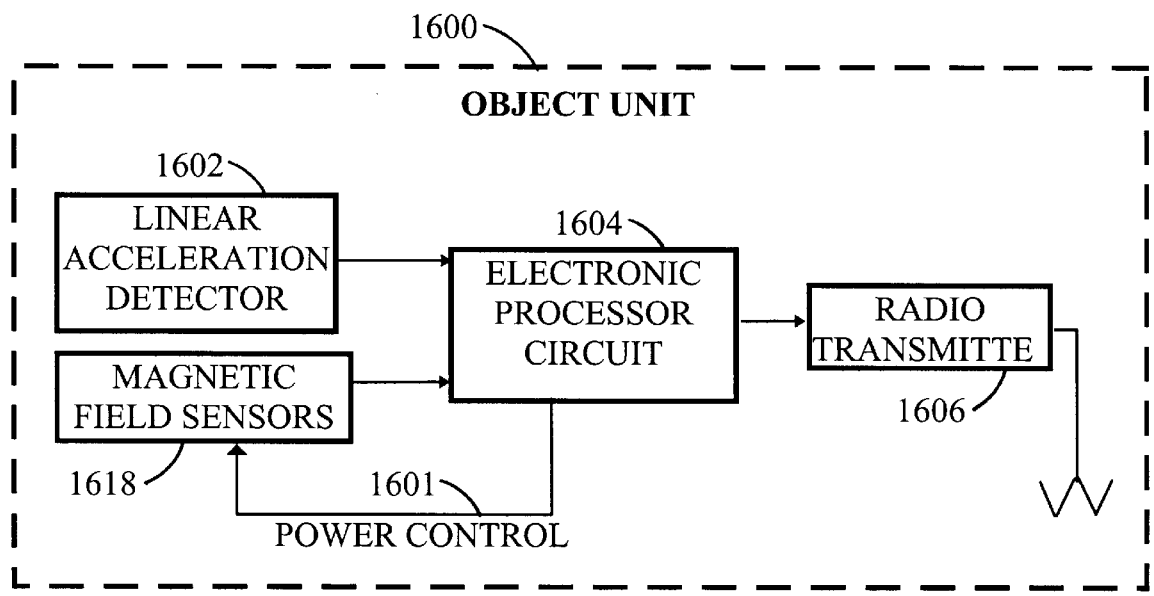
FIG. 16 shows a block diagram of the object unit for a device for measuring the speed, spin rate, and curve of a movable object of the present invention using a linear acceleration detector and separate object and monitor units.

FIGS. 16 and 17 illustrate two versions of the object unit of the second embodiment.

FIG. 16 illustrates an object unit with radio transmitter 1606 for radio transmitting motion data to external monitor unit 108. The motion data transmitted comprises elapsed flight time, speed, trajectory height, rotation period, spin rate, or any other raw or calculated measurement data.

In FIG. 16, electronic processor 1604 receives the output of linear acceleration detector 1602 and magnetic field sensor 1618. Electronic processor 1604 sends motion data to an external monitor unit through radio transmitter 1606 and controls the application of 3 volt battery power to magnetic field sensor 1618 via power control signal 1601.

FIG. 17 illustrates an object unit with output display 1719 such as an LCD for displaying the calculated speed or spin rate of the movable object. Display 1719 replaces radio transmitter 1606 of FIG. 16.

FIG. 18 illustrates magnetic field sensing coil 1801, its associated inductor/resistor relaxation oscillator 1802, inertial switch 1805, resistor 1806, battery +3 volts 1804, and electronic processor 1803.

FIG. 19 is an illustration of prior art and shows a cross-section of a particular realization of an inertial switch in detail. Pin 1902, spring coil 1904, and casing 1901 are all electrically conductive material. Pin 1902 an casing 1901 are normally isolated by the insulation barrier 1903. However, when exposed to an acceleration event such that the internal spring 1904 bends and touches the casing 1901, electrical continuity is provided between the pin 1902 and the casing 1901, thus signaling an acceleration event.

Referring again to FIG. 18, the input to the electronic processor 1803 from the inertial switch 1805 is normally low unless the movable object to which inertial switch 1805 is attached is activated by a linear acceleration event. In such an event the input goes active high.

In FIG. 18 the magnetoinductive field sensor comprises coil 1801 and relaxation oscillator 1802 and is the same as that described in FIG. 8. FIG. 18 shows only one magnetic field sensor coil; however, for additional sensitivity a second coil can be secured to the movable object and monitored by processor 1803. The second coil's longitudinal axis would optimally be oriented perpendicular to the longitudinal axis of the first coil 1801.

Figure 20:
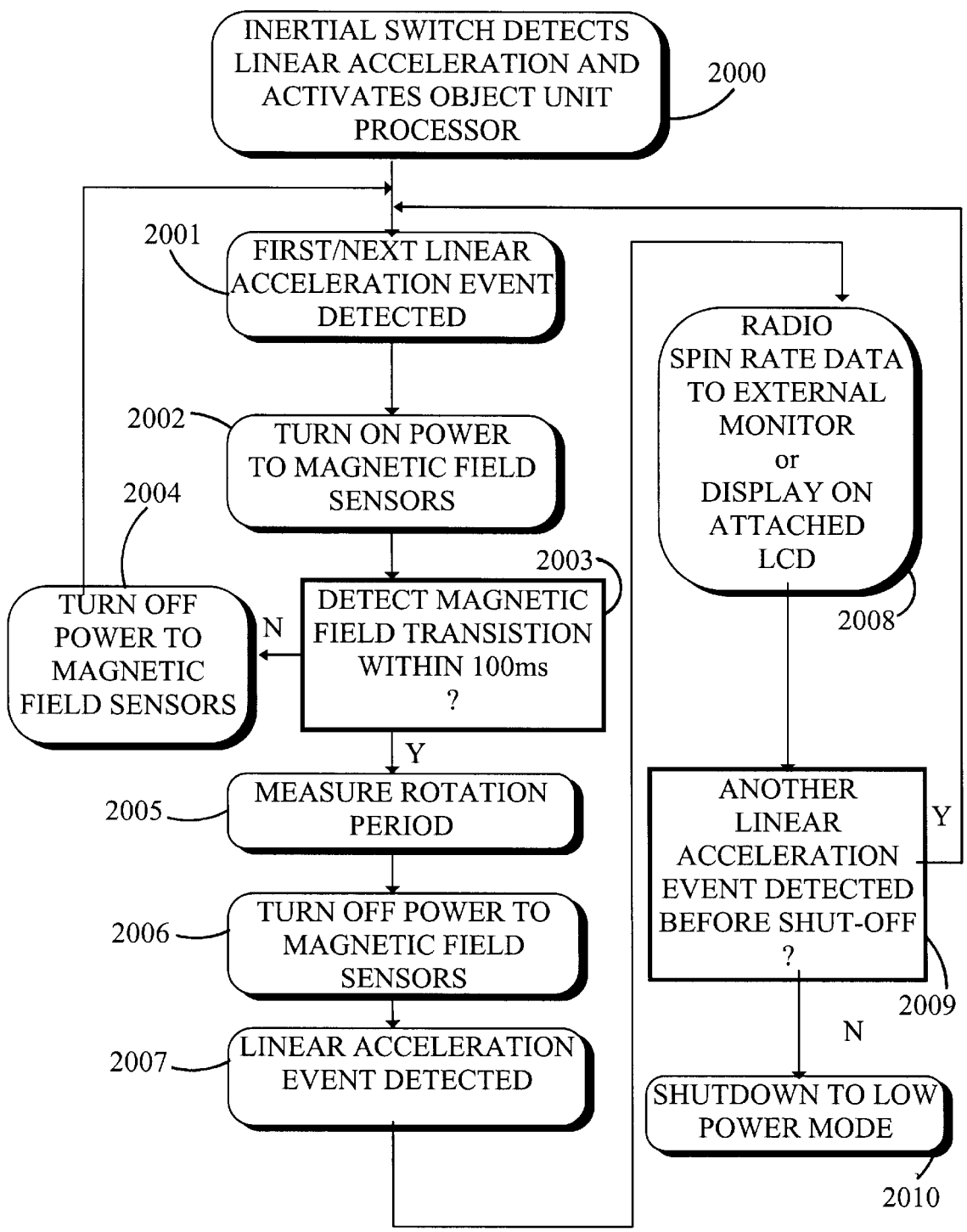
FIG. 20 shows a flowchart of an embodiment of the invention depicting object unit behavior for detecting linear acceleration, operating the magnetic field sensors, and transmitting data to the monitor unit.

FIG. 20 shows a flowchart for operating the magnetic field sensors in the second embodiment of the invention. This flowchart applies to either object unit 1700 (FIG. 17) or object unit 1600 (FIG. 16) but most references will be to the elements of FIG. 16. The starting point for the flowchart assumes that electronic processor 1604 (FIG. 16) is inactive in a low power mode. In step 2000 linear acceleration of the movable object causes the linear acceleration detector 1602 (FIG. 16) to activate. This in turn wakes up the processor from its low power mode.

In step 2001 the processor detects the acceleration event and, consequently, in step 2002 turns on power to magnetic field sensors 1618 (FIG. 16). In step 2003 the processor monitors the output of the sensors for fluctuations in the measured field strength indicative of rotation of the movable object relative to the earth's magnetic field. For the case of a baseball, for example, the linear acceleration event that occurs as the pitcher moves the ball in a windup and release should immediately be followed by spinning of the ball. Therefore, if no fluctuations are detected within 100 milliseconds, it is assumed that the linear acceleration event did not result from a pitcher's toss. The event should be ignored, so control passes to step 2004 where power to the magnetic field sensor is turned off and control returns to step 2001.

If, however, magnetic field transitions are detected that are indicative of rotation, control passes to 2005 where the rotation period is measured. In step 2006 power to the magnetic field sensors is turned off by electronic processor 1604 once the rotation period is measured.

For the baseball example, another linear acceleration event will be detected when the baseball is caught. This event is shown in step 2007. After the ball is caught, the spin rate data is radio transmitted to monitor unit 108 if the object unit is of the type shown in FIG. 16. If the object unit is of the type shown in FIG. 17, the spin rate is calculated and displayed on display 1719 (FIG. 17) attached to the movable object.

Referring still to FIG. 20, in step 2009 the processor awaits the next linear acceleration event. If one occurs before a 2 minute time-out, control returns to step 2001; otherwise, control passes to step 2010 where the processor shuts down to a low power mode.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A measuring device secured to a movable object, said measuring device comprising:
   a first magnetic field sensor for providing an output indicative of a change of alignment between said movable object and the earth's magnetic field;
   an electronic processor circuit connected to said output of said first magnetic field sensor, wherein said electronic processor circuit determines motion characteristics of said movable object from said output of said first magnetic field sensor; and
   an output display connected to said electronic processor circuit, for displaying said motion characteristics determined by said electronic processor circuit.

2. The measuring device according to claim 1 further comprising:
   a spin detection sensor network comprising
      a first mechanical g-force switch, and
      a second mechanical g-force switch mounted substantially diametrically opposed, about a center of rotation of said movable object, to said first mechanical g-force switch,
   wherein said spin detection sensor network provides a spin indication to said electronic processor circuit when said first mechanical g-force switch and said second mechanical g-force switch are simultaneously activated.

3. The measuring device according to claim 2 further comprising a circuit for supplying power to said first magnetic field sensor in response to said spin indication of said spin detection sensor network.

4. The measuring device according to claim 1 further comprising a second magnetic field sensor having an axis of sensitivity oriented at an angle greater than zero to an axis of sensitivity of said first magnetic field sensor, wherein said second magnetic field sensor senses changes of alignment with the earth's magnetic field for rotations of said object unit about an axis for which said first magnetic field sensor fails to sense changes in said first magnetic field sensor's degree of alignment with the earth's magnetic field.

5. The measuring device according to claim 1 wherein said motion characteristics displayed comprises a spin rate.

6. The measuring device according to claim 1 wherein said motion characteristics displayed comprises a count of rotations.

7. The measuring device according to claim 1 wherein said movable object is a sporting device.

8. The measuring device according to claim 1 further comprising an inertial switch that transitions from an open position to a closed position when subjected to linear accelerations of said movable device and that returns to said open position when said linear acceleration ends.

9. The measuring device according to claim 8 further comprising a circuit for supplying power to said first magnetic field sensor in response to said inertial switch having attained said closed position.

10. A system for measuring motion characteristics of a movable object, said system comprising:
    an object unit secured to said movable object, said object unit comprising
       a first magnetic field sensor for providing an output indicative of a change of alignment between said movable object and the earth's magnetic field;
       an electronic processor circuit connected to said first magnetic field sensor, wherein said electronic processor circuit receives an output of said first magnetic field sensor and further wherein said electronic processor circuit determines motion data of the movable object from said output of said first magnetic field sensor;
       a transmitter connected to said electronic processor circuit for transmitting at least one signal representing said motion data; and
    a monitor unit comprising
       a receiver for receiving said at least one signal from said transmitter;
       a monitor processor connected to said receiver; wherein said monitor processor determines at least one motion characteristic of said movable object; and
       an output display for displaying said at least one motion characteristic.

11. The system according to claim 10 wherein said object unit further comprises:
    a spin detection sensor network comprising
       a first mechanical g-force switch, and
       a second mechanical g-force switch mounted substantially diametrically opposed, about a center of rotation of the movable object, to said first mechanical g-force switch,
    wherein said spin detection sensor network provides a spin indication to said electronic processor circuit when said first mechanical g-force switch and said second mechanical g-force switch are simultaneously activated.

12. The system according to claim 11 wherein said object unit further comprises a circuit for supplying power to said first magnetic field sensor in response to said spin indication of said spin detection sensor network.

13. The system according to claim 10 wherein said object unit further comprises a second magnetic field sensor having an axis of sensitivity oriented at an angle greater than zero to an axis of sensitivity of said first magnetic field sensor, wherein said second magnetic field sensor senses changes of alignment with the earth's magnetic field for rotations of said movable object about an axis for which said first magnetic field sensor fails to sense changes in said first magnetic field sensor's degree of alignment with the earth's magnetic field.

14. The system according to claim 10 wherein said motion characteristics displayed comprises a spin rate.

15. The system according to claim 10 wherein said motion characteristics displayed comprises a count of rotations.

16. The system according to claim 10 wherein said movable object is a sporting device.

17. The system according to claim 10 further comprising an inertial switch that transitions from an open position to a closed position when subjected to linear accelerations of said movable device and that returns to said open position when said linear acceleration ends.

18. The system according to claim 17 wherein said object unit further comprises a circuit for supplying power to said first magnetic field sensor in response to said inertial switch having attained said closed position.

19. A method for measuring motion characteristics of a movable object, said method comprising the steps of:
    a) detecting a start of a spin event of said movable object with a spin detection sensor;
    b) monitoring at least one magnetic field sensor output for indications of magnetic field fluctuations resulting from rotations of said movable object through the earth's magnetic field;

c) determining spin rate data of said movable object from said magnetic field fluctuations; and d) displaying said spin rate data.

20. The method for measuring motion characteristics of a movable object according to claim 19 wherein step b further comprises the following step (b0) performed before step (b) and the following step (b1) performed after step (b):

b0) turning power on to said at least one magnetic field sensor within said movable object; and b1) turning power off to said at least one magnetic field sensor within said movable object.

21. The method for measuring a movable object according to claim 19 further comprising the step:

e) repeating steps a) through d) for each next spin event of said movable object.

22. The method for measuring motion characteristics of a movable object according to claim 19, wherein step d) comprises the steps:

d1) transmitting a signal indicating said spin rate data from said object unit to an external monitor unit;

d2) receiving said signal indicating said spin rate data in a receiver located in said monitor unit, and d3) displaying the spin rate of said movable object on an output display connected to a monitor processor within said monitor unit.

23. A method for measuring motion characteristics of a movable object comprising the steps of:

a) detecting a launch of a movable object with a mechanical inertial switch secured to the movable object;

b) monitoring at least one magnetic field sensor output for indications of magnetic field fluctuations resulting from rotations of said movable object through the earth's magnetic field;

c) determining spin rate data of said movable object from said magnetic field fluctuations; and d) displaying said spin rate data.

24. The method for measuring motion characteristics of a movable object according to claim 23 wherein step b further comprises the following step (b0) performed before step (b), and the following step (b1) performed after step (b):

b0) powering said at least one magnetic field sensor within said movable object; and b1) removing power from said at least one magnetic field sensor within said movable object.

25. The method for measuring a movable object according to claim 23 further comprising the step:

e) repeating steps a) through d) for each next launch of said movable object.

26. The method for measuring motion characteristics of a movable object according to claim 23 wherein step d) further comprises the steps of:

d1) transmitting from said object unit to an external monitor unit, a signal representative of said spin rate data;

d2) receiving said signal indicating said spin rate data in a receiver located in said monitor unit; and d3) displaying spin rate of said movable object on an output display connected to a monitor processor within said monitor unit.

* * * * *